(12) United States Patent
Kato et al.

(10) Patent No.: US 8,280,177 B2
(45) Date of Patent: Oct. 2, 2012

(54) ENCODING DEVICE USING PARALLELIZED ENCODING, DECODING DEVICE USING PARALLELIZED DECODING, AND IMAGE FORMING DEVICE, METHOD, AND PROGRAM STORAGE MEDIUM INCLUDING THE SAME

(75) Inventors: Seishiro Kato, Kanagawa (JP); Yoshihiko Nemoto, Kanagawa (JP); Taro Yokose, Kanagawa (JP); Tomoki Taniguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 728 days.

(21) Appl. No.: 12/466,802

(22) Filed: May 15, 2009

(65) Prior Publication Data
US 2010/0104204 A1  Apr. 29, 2010

(30) Foreign Application Priority Data
Oct. 23, 2008  (JP) ................... 2008-273124

(51) Int. Cl.
*G06K 9/36* (2006.01)
*G06K 9/46* (2006.01)
(52) U.S. Cl. ....................... 382/232; 382/239
(58) Field of Classification Search .......... None
See application file for complete search history.

(56) References Cited

U.S. PATENT DOCUMENTS

| | | | | |
|---|---|---|---|---|
| 5,111,293 A * | 5/1992 | Yamashita | ............... | 375/240.12 |
| 5,319,469 A * | 6/1994 | Moolenaar | ................... | 382/236 |
| 5,987,182 A * | 11/1999 | Kimura et al. | ................ | 382/239 |
| 2005/0135433 A1* | 6/2005 | Chang et al. | .................. | 370/536 |
| 2006/0210176 A1* | 9/2006 | Kajiwara et al. | .............. | 382/232 |

FOREIGN PATENT DOCUMENTS

| JP | 10-235945 A | 9/1998 |
|---|---|---|
| JP | 2004080387 A * | 3/2004 |
| JP | 2010088052 A * | 4/2010 |

* cited by examiner

*Primary Examiner* — Li Liu
(74) *Attorney, Agent, or Firm* — Sughrue Mion, PLLC

(57) ABSTRACT

An encoding device includes a first memory that stores image data, plural second memories that are associated with plural target pixels in the image data, each second memory storing pixel data of one or more reference pixels near the associated target pixel thereof, a controller that causes each second memory to store pixel data of the one or more reference pixels near the associated target pixel thereof specified from the image data stored in the first memory, and plural encoders that perform encoding on each of the plural target pixels by estimating pixel data of each target pixel using pixel data of the one or more reference pixels near each respective target pixel stored in the plural second memories wherein the plural target pixels have different positions in a subscanning direction such that one target pixel does not overlap with another target pixel in a main scanning direction, and the total amount of data of all of the reference pixels used by the plural encoders is equal to or less than the amount of information of one line of image data stored in the first memory.

17 Claims, 16 Drawing Sheets

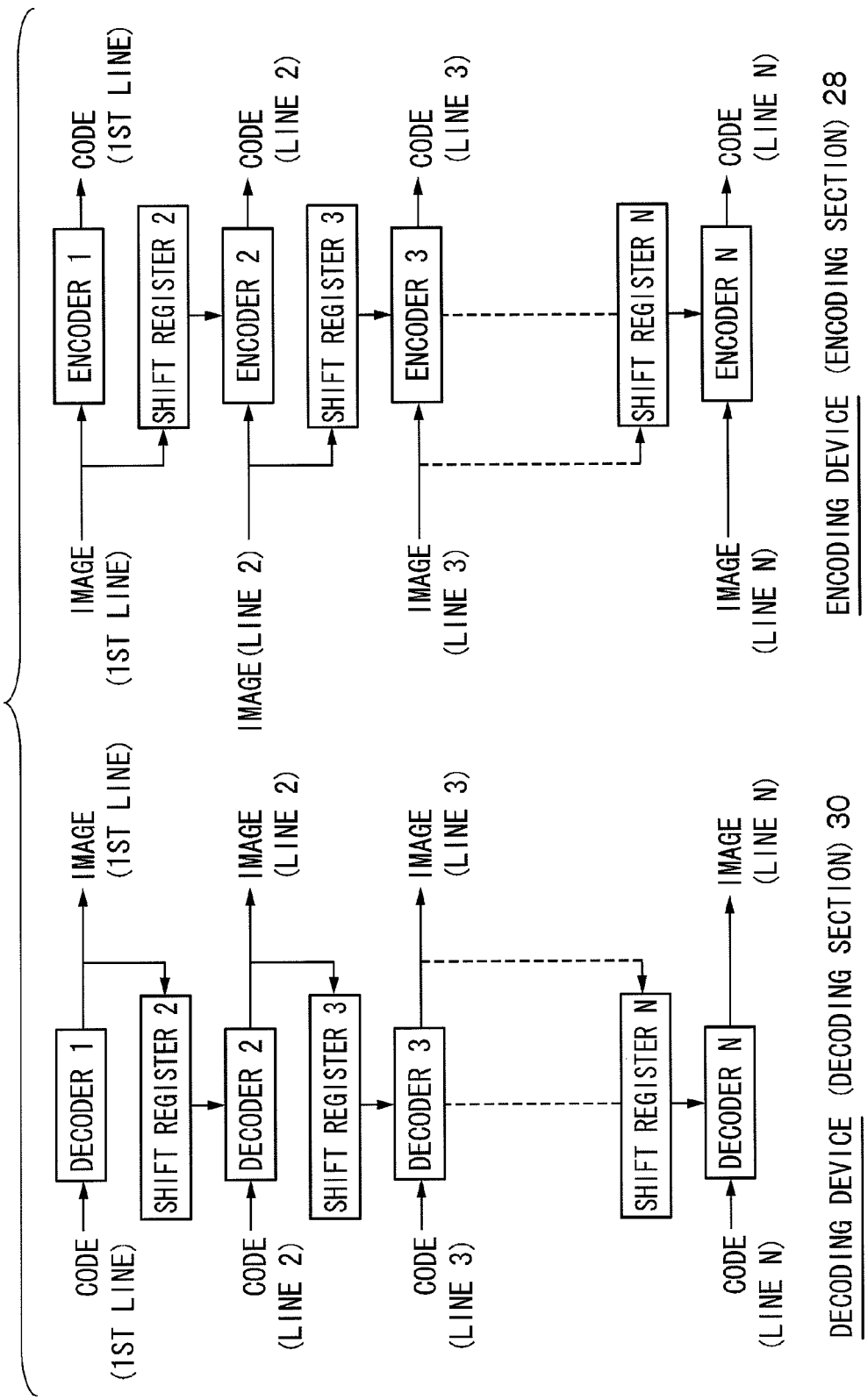

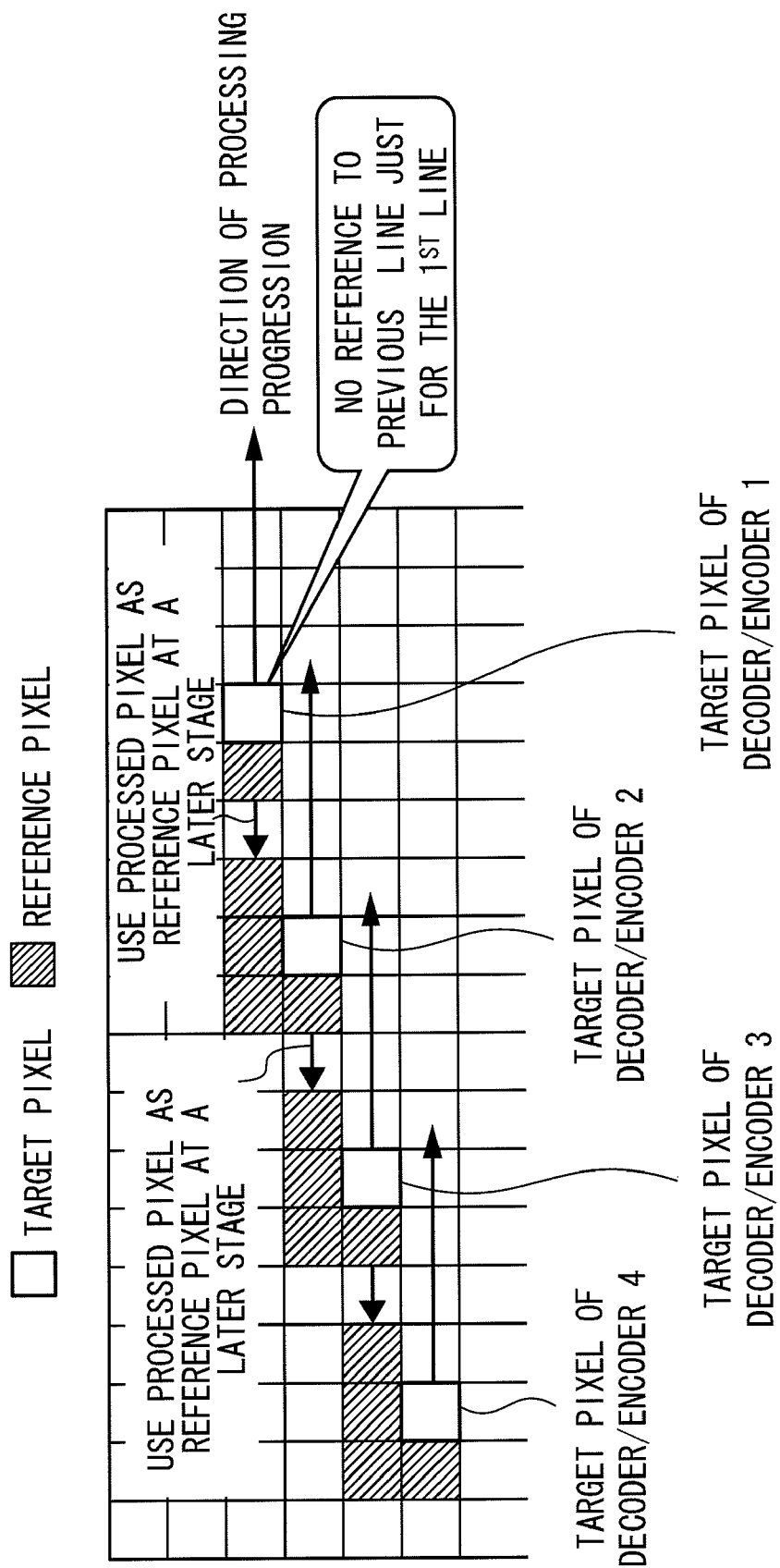

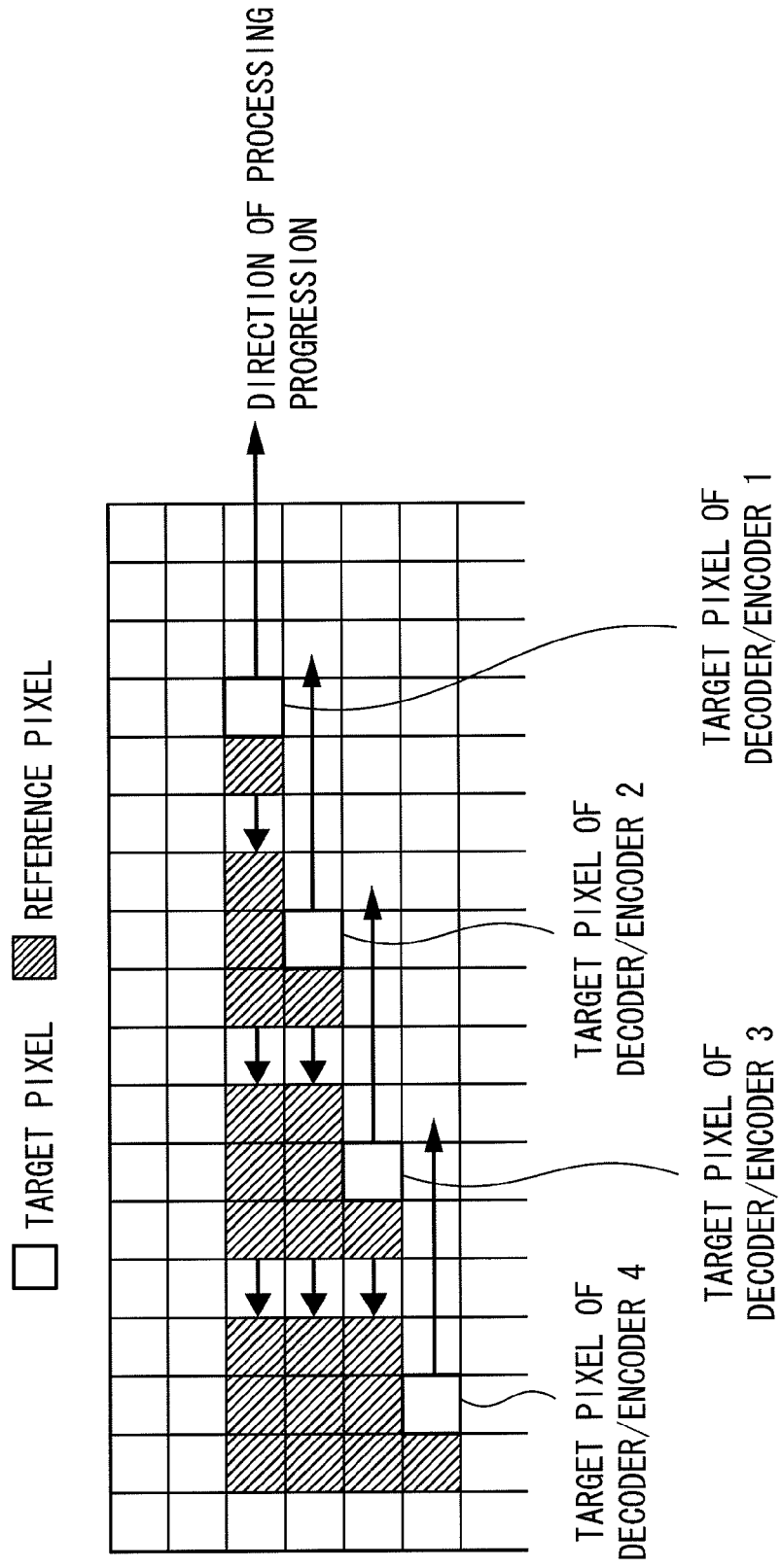

US 8,280,177 B2

ENCODING DEVICE USING PARALLELIZED ENCODING, DECODING DEVICE USING PARALLELIZED DECODING, AND IMAGE FORMING DEVICE, METHOD, AND PROGRAM STORAGE MEDIUM INCLUDING THE SAME

CROSS-REFERENCE TO RELATED APPLICATION

This application is based on and claims priority under 35 USC 119 from Japanese Patent Application No. 2008-273124 filed Oct. 23, 2008.

BACKGROUND

1. Technical Field

The present invention relates to encoding device, decoding device, image forming device, method, and program storage medium.

2. Related Art

There are known control units (controllers) of image forming devices that speed up processing by parallelizing encoding and decoding. In such control units, the number of encoders and decoders is set to be the number of bands, in order to execute encoding and decoding from a value of a target pixel estimated from near pixels. In the known technique, encoding and decoding is performed while sliding the target pixels and the reference pixels along a main scanning direction.

SUMMARY

According to an aspect of the invention, the encoding device of the present invention includes: a first memory that stores image data; plural second memories that are associated with plural target pixels in the image data, each second memory storing pixel data of one or more reference pixels near the associated target pixel thereof, a controller that causes each second memory to store pixel data of the one or more reference pixels near the associated target pixel thereof, and plural encoders that perform encoding on each of the plural target pixels by estimating pixel data of each target pixel using pixel data of the one or more reference pixels near each respective target pixel stored in the plural second memories; wherein the plural target pixels have different positions in a subscanning direction such that one target pixel does not overlap with another target pixel in a main scanning direction, and the total amount of data of all of the reference pixels used by the plural encoders is equal to or less than the amount of information of one line of image data stored in the first memory.

BRIEF DESCRIPTION OF THE DRAWINGS

Exemplary embodiments of the present invention will be described in detail based on the following figures, wherein:

FIGS. 5A and 5B are diagrams for explaining encoding and decoding in the first exemplary embodiment;

FIGS. 9A and 9B are diagrams for explaining encoding and decoding in the second exemplary embodiment;

DETAILED DESCRIPTION

First Exemplary Embodiment

Explanation will now be given of a first exemplary embodiment of the present invention, with reference to the drawings. In the present exemplary embodiment an example is explained of application of the present invention to an image forming device including an image processing device as an encoding device and a decoding device.

Figure 1:
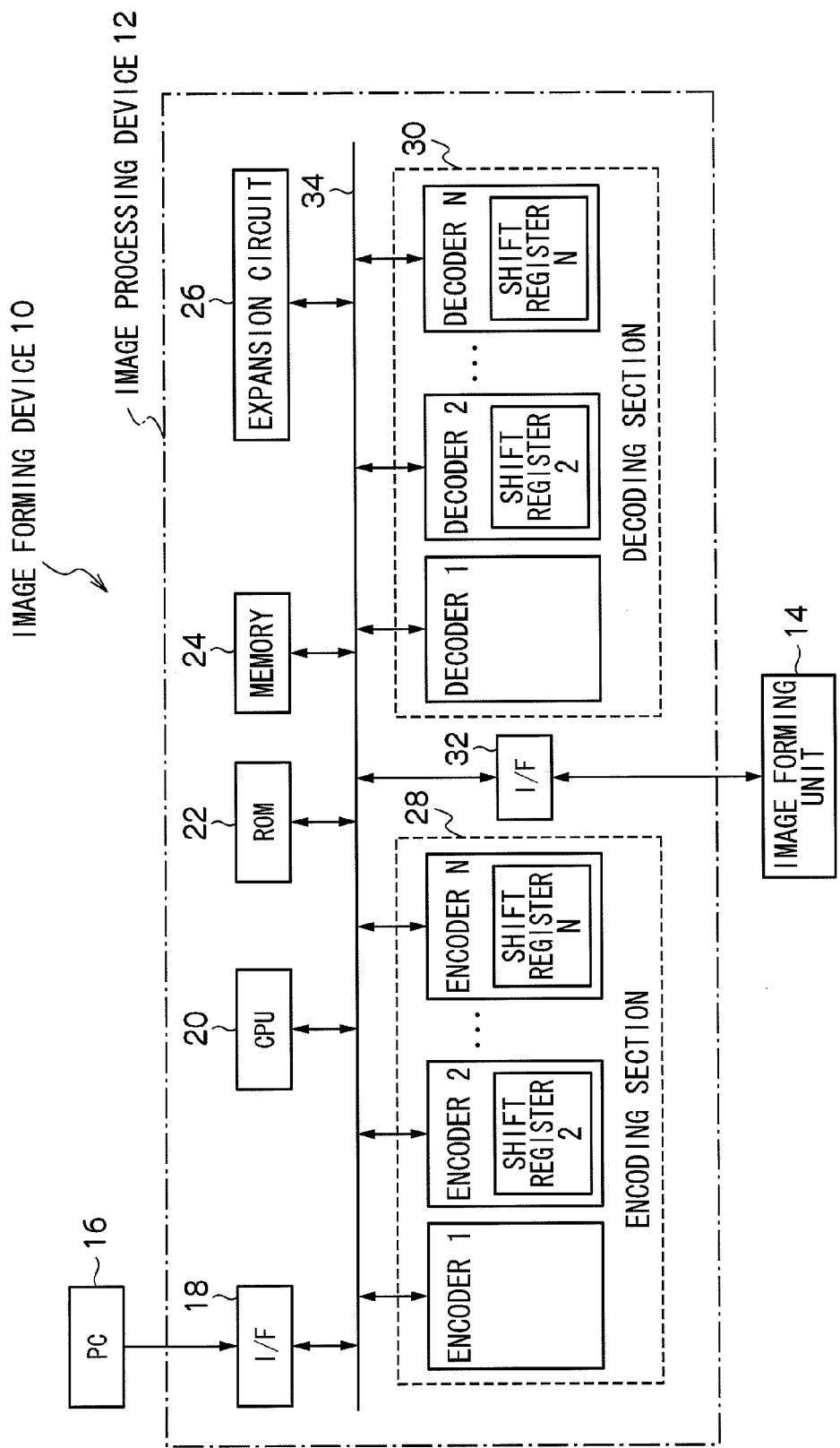
FIG. 1 is a schematic diagram showing a first exemplary embodiment.

An image forming device 10 according to the present exemplary embodiment is, as shown in FIG. 1, provided with an image processing device 12, and an image forming unit 14 that forms, sends, an image based on input image data onto an image forming medium (for example paper).

The image processing device 12 includes an I/F (interface) 18, CPU (Central Processing Unit) 20, ROM (Read Only Memory) 22, memory 24, expansion circuit 26, encoding (compression) section 28, decoding (decompression) section 30, and I/F 32. The I/F 18 receives PDL data, described in a Page Description Language, input from an external PC (Personal Computer) 16. The expansion circuit 26 expands the input intermediate data into bit map data. The encoding section 28 is provided with N encoders, encoder 1 to encoder N, for encoding images. The decoding section 30 is provided with N decoders, decoder 1 to decoder N, for decoding encoded images. The I/F 32 is for sending image data to the image forming unit 14. The I/F 18, CPU 20, ROM 22, memory 24, expansion circuit 26, encoding section 28, decoding section 30, and I/F 32 are all mutually connected together through a bus 34. The memory 24 corresponds to the first memory.

The encoder 1 executes encoding (1) as explained in detail below. Encoders 2 to N each execute encoding (2) as explained in detail below. Each of the encoders 2 to N have a shift register 2 to N, respectively, that employ a FIFO (First In-First Out) protocol. In addition, a decoder 1 executes decoding (1) as explained in detail below. Decoders 2 to N each execute decoding (2) as explained in detail below. Each of the decoders 2 to N have a shift register 2 to N, respectively, that employ a FIFO (First In-First Out) protocol. The shift registers 2 to N of these encoders, and the shift registers 2 to N of the decoders, each have a storage capacity sufficient for pixel data of reference pixels used in the encoding by the respective encoder or in the decoding by the respective decoder. The total of the storage capacities of the shift registers 2 to N, having "storage capacities sufficient for pixel data of reference pixels", is less than the "storage capacity sufficient for image data of one line of pixels of the image". For example, if the number of reference pixels used in encoding of a respective encoder is 3 pixels and image data for one pixel uses 8 bits, then the storage capacity of the shift register of the respective encoder is 24 (3×8) bits worth of storage. Any storage capacity may be used that is capable of at least storing the image data of reference pixels used in the encoding of the respective encoder, or in the decoding of the respective decoders, as long as the total of the storage capacities of the shift registers 2 to N of the encoders, and the total of the storage capacities of the shift registers 2 to N of the decoders, are less than "storage capacity sufficient for image data of one line of pixels of the image". The shift registers 2 to N of the encoder and the shift registers 2 to N of the decoders correspond to the second memory.

A basic program, such as OS or the like, is stored in the ROM 22 serving as a memory. There is also a control program stored in the ROM 22 for controlling the operation of the image forming device 10.

The CPU 20 reads out and executes the program from the ROM 22. Various types of data (various information) are temporarily stored in the memory 24.

Figure 2:
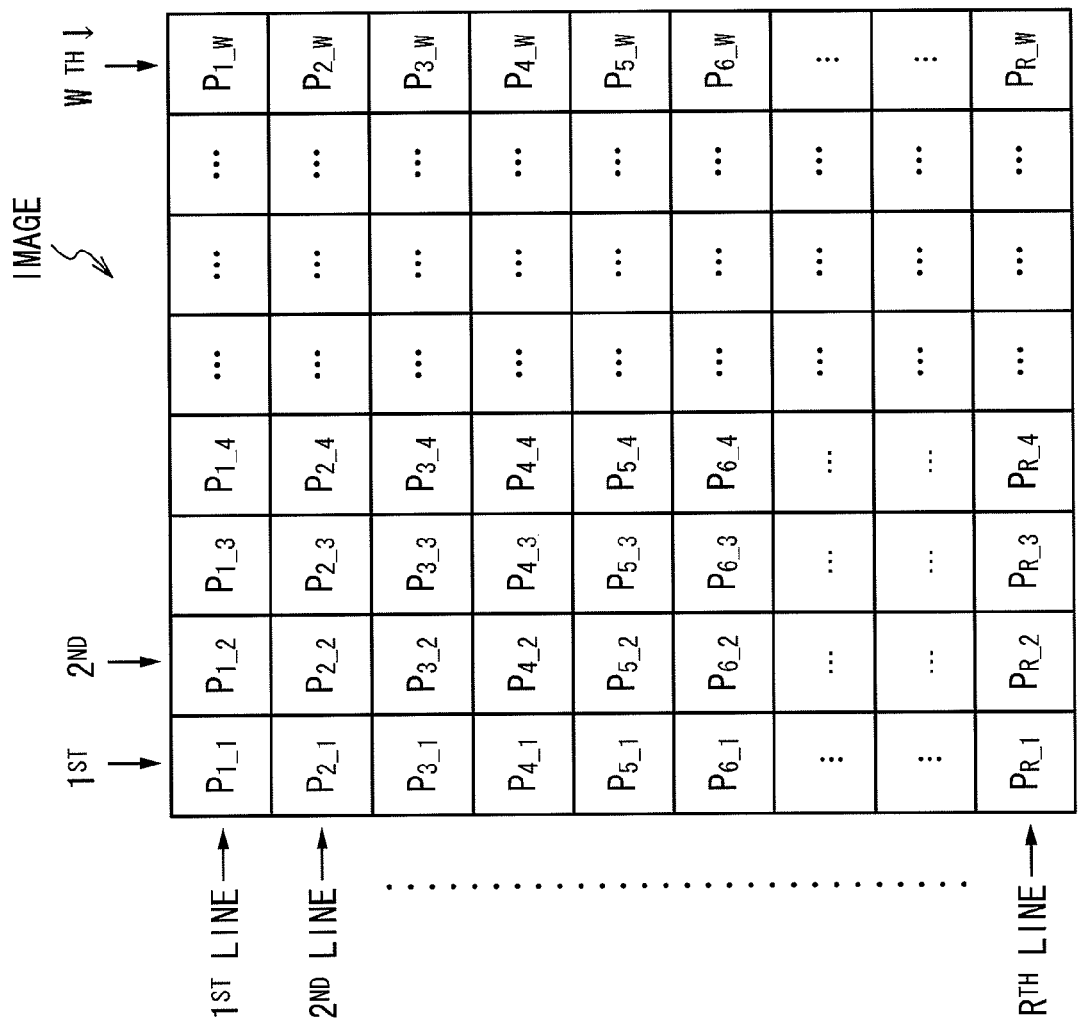
FIG. 2 is a diagram for explaining an image configuration.

The CPU 20, for example, is operated in the following manner by execution of a control program. Namely, the CPU 20 converts PDL data of an image to be formed, input from the PC 16, into intermediate data, inputs the converted intermediate data into the expansion circuit 26, and stores the bit map data expanded in the expansion circuit 26 in the memory 24. The image represented by bit map data is an image consisting of plural pixels $P_{i\_j}$ (i=1, 2, ..., R; j=1, 2, ..., W), as shown in FIG. 2. Here i is information representing which line the pixel is from, and j is information representing the place of the pixel within the line.

The CPU 20 sends the $1^{st}$ line of pixel data (image data) from the bit map data stored in the memory 24 to the encoder 1. The $1^{st}$ line of the image represented by the bit map data stored in the memory 24 is thereby encoded. The CPU 20 sends one line of pixel data (image data) of the bit map data, in a similar manner, for each of the lines from the $2^{nd}$ line to the $N^{th}$ line to the corresponding encoder. "Sending one line of pixel data (image data) of the bit map data to the corresponding encoder" means that the pixel data of one line of pixels in the $K^{th}$ line (K=1, 2, ..., N) is sent to the encoder K.

Then, in encoding executed in each of the encoders K (K=2, 3, ... N) described in detail later, for each target pixel specified, the CPU 20 stores pixel data (image data) of the pixel corresponding to reference pixels near the specified target pixel, out of the plural pixels of the image stored in the memory 24, in the shift register K of the encoder K. More specifically, the CPU 20 receives a report from the encoder K (K=2, 3, ... N) stating that the pixel $P_{i'\_j'}$ (i'=2 ... R; j'=2, ... W) has been specified as the target pixel. When this is received, the CPU 20 reads out from the memory 24 pixel data of pixel $P_{i'-1\_j'+1}$, out of the reference pixels near the target pixel (pixel) $P_{i'\_j'}$ in the present exemplary embodiment, these being the pixels $P_{i'-1\_j'-1}$, $P_{i'-1\_j'}$, $P_{i'-1\_j'+1}$, and stores the pixel data of the read-out pixel $P_{i'-1\_j'+1}$ in the shift register K. The shift register is used as the memory for storing the reference pixels used in processing in the present exemplary embodiment. Consequently, when the report is received from the encoder K stating that the pixel $P_{i'\_j'}$ has been specified as the target pixel, the pixel data for the pixel $P_{i'-1\_j'+1}$ is read out from the memory 24, and the pixel data of the pixel $P_{i'-1\_j'+1}$ is used to refresh the shift register K. The contents stored in the shift register K thereby changes from stored contents of the pixel data of the pixels $P_{i'-1\_j'-2}$, $P_{i'-1\_j'-1}$, $P_{i'-1\_j'}$, to stored contents of the pixel data of the pixels $P_{i'-1\_j'-1}$, $P_{i'-1\_j'}$, $P_{i'-1\_j'+1}$. If a memory is used other than the shift register as the memory for storing the reference pixels used in processing, then when a result report is received from the encoder K stating that the pixel $P_{i'\_j'}$ has been specified as the target pixel, the pixel data of the pixels $P_{i'-1\_j'-1}$, $P_{i'-1\_j'}$, $P_{i'-1\_j'+1}$, the reference pixels near the target pixel (pixel) $P_{i'\_j'}$ in the present exemplary embodiment, may be read out from the memory 24, and the pixel data of pixels $P_{i'-1\_j'-1}$, $P_{i'-1\_j'}$, $P_{i'-1\_j'+1}$ is stored in the memory. If the pixel $P_{i'-1\_j'}$ is used as the reference pixel near the target pixel (pixel) $P_{i'\_j'}$ in the present exemplary embodiment, the value of the pixel $P_{i'-1\_j'}$ is included in the pixel data of the one line of pixels sent to the encoder K. Consequently, there is no need to send this value to the shift register K in the present exemplary embodiment.

The CPU 20 then stores the pixel data of the respective images encoded in each of the respective encoders 1 to N in the memory 24. Next, in a similar manner as in the above described process, the CPU 20 sends image data for one line of pixels in the $(N+1)^{th}$ line to the encoder 1, image data for one line of pixels in the $(N+2)^{th}$ line to the encoder 2, ... up to the image data for one line of pixels in the $(N+N)^{th}$ line to the encoder N, and stores the pixel data of the respective images encoded in each of the encoders 1 to N in the memory 24. The CPU 20 repeats this processing until the last $R^{th}$ line of the first page of the bit map data is reached. The image of the first page represented by the bit map data is thereby stored in the memory 24 as encoded information (encoded data), and the image of the first page is encoded. When the image of the first page has been encoded the CPU 20 performs similar processing on the second page, and so on for all the other pages in a similar manner. The images of all the pages represented by bit map data stored in the memory 24 are thereby encoded and stored in the memory 24.

In order to decode the first line of the encoded image stored in the memory 24, the CPU 20 sends the encoded values of the pixels of the 1st line of the encoded image (encoded data of the $1^{st}$ line) stored in the memory 24 to the decoder 1. In a similar manner, for each line from the $2^{nd}$ to the $N^{th}$ line, the CPU 20 sends the encoded values of the pixels of one line of the encoded image (encoded data of each line) to the corresponding decoder. "Sending the encoded values of the pixels of one line of the encoded image ... to the corresponding decoder" means that one line of encoded data for the $K^{th}$ line (K=1, 2, ..., N) is sent to the decoder K. Then, in decoding executed in each of the decoders K (K=2, 3, ... N) described in detail later, from the image pixels decoded by the specific decoder K, the pixel data of those pixels corresponding to reference pixels near a specified target pixel decoded by another decoder (in the present exemplary embodiment the decoder K+1) different to the specific decoder K, are stored in the shift register K+1 of the corresponding decoder K+1, each time the target pixel of the another decoder (decoder K+1 in the present exemplary embodiment) is specified. More specifically, the CPU 20 receives from the decoder K+1 (K=1, 2, 3, ... N−1) a report stating that the pixel $P_{i'\_j'}$ (i'=2, ... R; j'=2, ... W) has been specified as the target pixel. When this has been received, the CPU 20 receives from the decoder K (via memory 24) pixel data of the pixel $P_{i'-1\_j'+1}$ that has been decoded by the decoder K, out of the reference pixels near the target pixel (pixel) $P_{i'\_j'}$ in the present exemplary embodiment, these being the pixels $P_{i'-1\_j'-1}$, $P_{i'-1\_j'}$, and $P_{i'-1\_j'+1}$. The received pixel data of the pixel $P_{i'-1\_j'+1}$ is then used to refresh the shift register K+1 of the decoder K+1. In the present exemplary embodiment shift registers are used as memories for storing reference pixels. Consequently, when the report is received from the decoder K+1 stating that the pixel $P_{i'\_j'}$ has been specified for the target pixel, by using the received pixel data of the $P_{i'-1\_j'+1}$ to refresh the shift register K+1, the contents stored in the shift register K+1 thereby changes from the pixel data of the pixels $P_{i'-1\_j'-2}$, $P_{i'-1\_j'-1}$, $P_{i'-1\_j'}$ to the pixel data of the pixels $P_{i'-1\_j'-1}$, $P_{i'-1\_j'}$, $P_{i'-1\_j'+1}$. If a memory is used other than the shift register as the memory for storing the reference pixels, then configuration may be made such that when a report is received from the encoder K+1 stating that the pixel $P_{i'\_j'}$ has been specified as the target pixel, pixel data of the reference pixels near the target pixel (pixel) $P_{i'\_j'}$ of the present exemplary embodiment, these being the pixels $P_{i'-1\_j'-1}$, $P_{i'-1\_j'}$, $P_{i'-1\_j'+1}$, are received from the decoder K, and the received pixel data of the pixels $P_{i'-1\_j'-1}$, $P_{i'-1\_j'}$, $P_{i'-1\_j'+1}$ is stored in the memory. With regard to cases where the pixel $P_{i'-1\_j'}$ is used as the reference pixel near the target pixel (pixel) $P_{i'\_j'}$, in the present exemplary embodiment, the value of the pixel $P_{i'-1\_j'}$ is already included in the image data of the one line of pixels sent to the decoder K+1, and so in the present exemplary embodiment there is no need to send this value to the shift register K+1.

The CPU 20 then stores the image data of the respective images decoded by each of the respective decoders 1 to N in the memory 24. Next, in a similar manner to the above described processing, the encoded values of one line for the $(N+1)^{th}$ line is sent to the decoder 1, the encoded values of one line for the $(N+2)^{th}$ line is sent to the decoder 2, and so on until, the encoded values of one line for the $(N+N)^{th}$ line is sent to the decoder N. In a similar manner as in the above described process, the image data of the pixels decoded in each of the respective decoders 1 to N is stored in the memory 24. The CPU 20 repeats this processing until the last $R^{th}$ line of the page 1. Thereby, decoded data for the image of page 1 (namely the bit map data of page 1) is stored in the memory 24, and the image of page 1 is decoded. When the image of page 1 has been decoded the CPU 20 then performs similar processing on page 2, and so on with similar processing performed for all of the pages. The images of all of the pages are thereby decoded, and stored in the memory 24.

The CPU 20 then sends the bit map data stored in the memory 24 for all of the pages to the image forming unit 14, via the I/F 32. An image forming medium is thereby sent from the image forming unit 14, with an image formed thereon based on the bit map data.

The PC 16 is connected to the I/F 18. The image forming unit 14 is connected to the I/F 32.

The expansion circuit 26 expands input intermediate data into bit map data.

Figure 3:
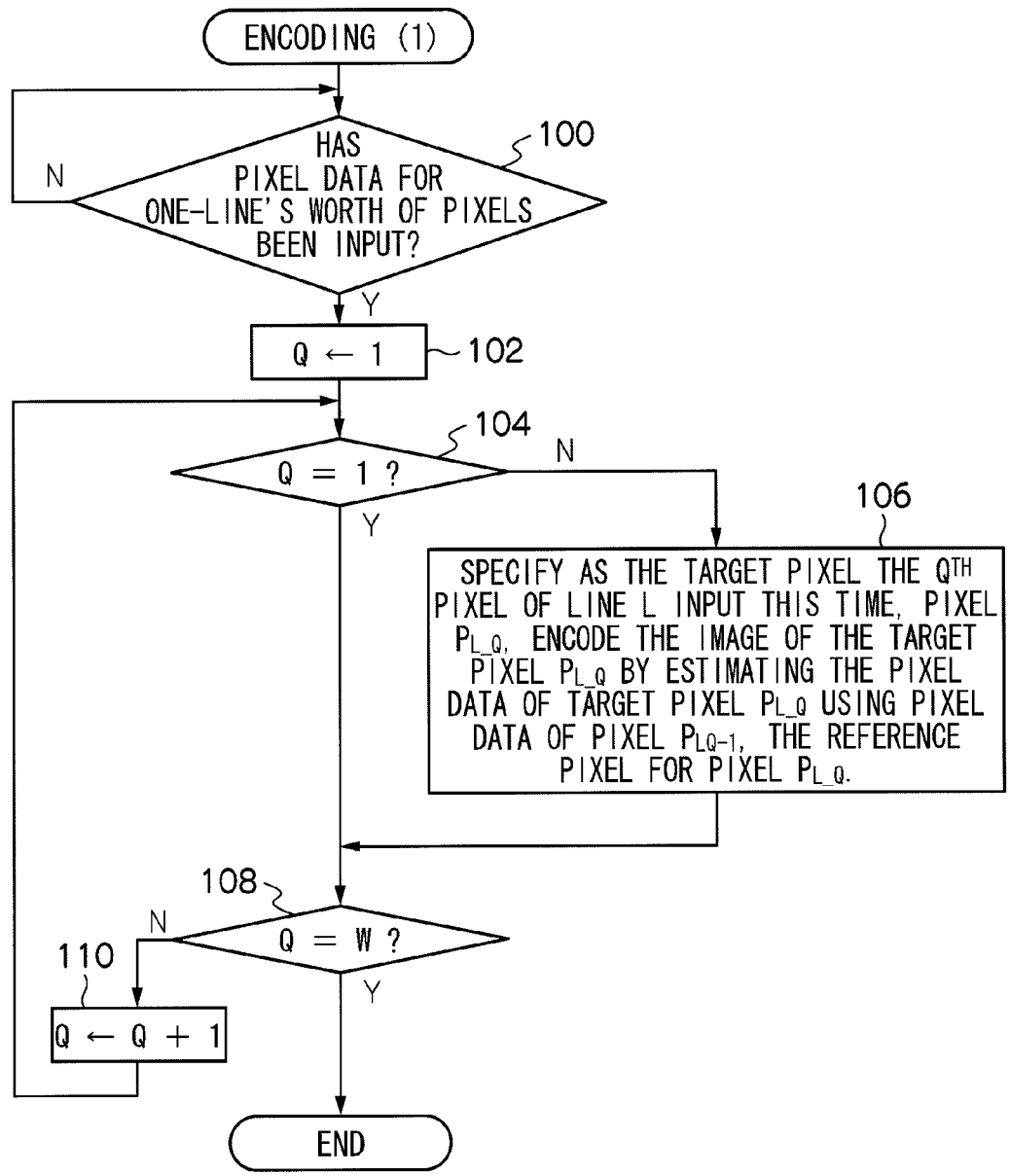
FIG. 3 is a diagram showing a flow chart of a processing routine of encoding (1) executed in an encoder of the first exemplary embodiment.

Explanation will now be given of encoding (1) executed by the encoder 1, with reference to FIG. 3, and FIGS. 5A, 5B. In FIGS. 5A, 5B an example is explained where N=4.

First at step 100, determination is made as to whether or not pixel data (image data) for one line of pixels has been input from the CPU 20.

Determination processing is repeated at step 100 until it is determined that pixel data (image data) for one line of pixels has been input from the CPU 20.

When it is determined at step 100 that image data for one line of pixels has been input from the CPU 20 the routine proceeds to the next step 102. At step 102 a variable Q is initialized by setting the value of variable Q to 1.

At the next step 104, determination is made as to whether or not the value of variable Q is 1. When it is determined at step 104 that the value of variable Q is 1 then the routine proceeds to step 108. At step 108 determination is made as to whether or not the value of variable Q is the number of pixels W in one line of pixels. Determination is thereby made as to whether or not the processing for encoding of step 106, explained in detail below, has been performed for pixels up to the final pixel W of one line of pixels (from the 2nd to the $W^{th}$ pixel).

At step 108, when the value of variable Q is determined as not being W, then it is concluded that the processing for encoding of step 106 has not been repeated for pixels up to the final pixel of one line of pixels (from the $2^{nd}$ to the $W^{th}$ pixel), and the routine proceeds to step 110.

The value of variable Q is incremented by 1 at step 110. The routine then returns to step 104.

However, if determination is made at step 104 that the value of variable Q is not 1 then the routine proceeds to step 106. At step 106 the $Q^{th}$ pixel of the pixels in the line L that was input this time, this being pixel $P_{L\_Q}$, is specified as the target pixel. The pixel data of the target pixel $P_{L\_Q}$ is then estimated using the pixel data of the reference pixel $P_{L\_Q-1}$ near the target pixel $P_{L\_Q}$. The image of the specified target pixel $P_{L\_Q}$ is thereby encoded. The routine proceeds to step 108.

When, at step 108, the value of variable Q is determined to be W, then it is concluded that the processing for encoding of step 106 has been performed for pixels up to the final pixel of one line of pixels (from the $2^{nd}$ to the $W^{th}$ pixel), and the encoding (1) is ended.

Figure 4:
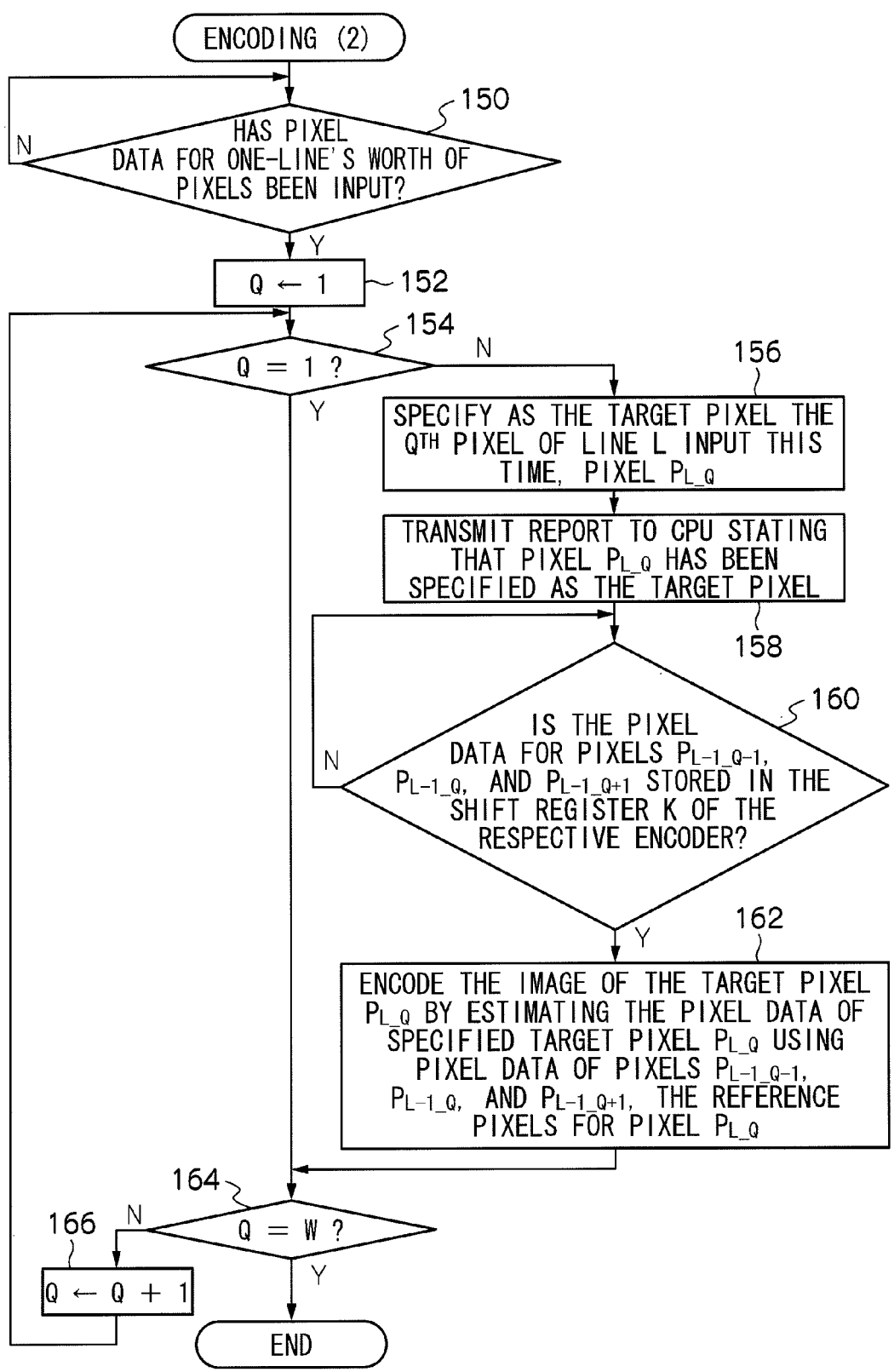
FIG. 4 is a diagram showing a flow chart of a processing routine of encoding (2) executed in an encoder of the first exemplary embodiment.

Explanation will now be given of the encoding (2) executed in each of the respective encoders 2 to N, with reference to FIG. 4 and FIGS. 5A and 5B.

First, at step 150, determination is made as to whether or not pixel data (image data) of one line of the pixels has been input from the CPU 20.

The determination processing is repeated at step 150 until determination is made that pixel data (image data) of one line of pixels has been input from the CPU 20.

When it is determined at step 150 that pixel data (image data) of one line of pixels has been input from the CPU 20 the routine proceeds to step 152. At step 152 variable Q is initialized by setting the value of variable Q to 1.

At the next step 154 determination is made as to whether or not the value of variable Q is 1. When it is determined at step 154 that the value of variable Q is 1 then the routine proceeds to step 164. At step 164 determination is made as to whether or not the value of variable Q is the number of pixels W in one line of pixels. Determination is thereby made as to whether or not the processing for encoding of steps 156 to 162, explained in detail below, has been performed for pixels up to the final pixel W of one line of pixels (from the $2^{nd}$ to the $W^{th}$ pixel).

At step 164, when the value of variable Q is determined as not being W, then it is concluded that the processing for encoding of steps 156 to 162 has not been repeated for pixels up to the final pixel of one line of pixels (from the $2^{nd}$ to the $W^{th}$ pixel), and the routine proceeds to step 166.

The value of variable Q is incremented by 1 at step 166. The routine then returns to step 154.

However, if determination is made at step 154 that the value of variable Q is not 1 then the routine proceeds to step 156. At step 156 the $Q^{th}$ pixel (the same value as the value of variable Q) of the pixels in line L that was input this time, this being pixel $P_{L\_Q}$, is specified as the target pixel.

In the next step 158, a result report representing the fact that the pixel $P_{L\_Q}$ has been specified as the target pixel is transmitted to the CPU 20.

In the next step 160, determination is made as to whether or not the pixel data of the pixels $P_{L-1\_Q-1}$, $P_{L-1\_Q}$, $P_{L-1\_Q+1}$ is stored in the shift register K (K=2, 3, . . . N) of the respective encoder. This determination processing is repeated until determination is made that the pixel data of the pixels $P_{L-1\_Q-1}$, $P_{L-1\_Q}$, $P_{L-1\_Q+1}$ is stored in the shift register K of the respective encoder.

At step 160, when determination is made that the pixel data of the pixels $P_{L-1\_Q-1}$, $P_{L-1\_Q}$, $P_{L-1\_Q+1}$ is stored in the shift register K of the respective encoder, the routine proceeds to the next step 162.

At step 162 the pixel data of the target pixel $P_{L\_Q}$ specified in the above step 156 is then estimated using the reference pixels near the target pixel $P_{L\_Q}$, the pixel data of the pixel $P_{L\_Q-1}$ and the pixel data stored in the shift register K for the pixels $P_{L-1\_Q-1}$, $P_{L-1\_Q}$, $P_{L-1\_Q+1}$. The image of the target pixel $P_{L\_Q}$ is thereby encoded. The routine then proceeds to step 164.

However, when it is determined at step 164 that the value of variable Q is W, then it is concluded that the processing for encoding of steps 156 to 162 has been performed for pixels up to the final pixel of one line of pixels (from the $2^{nd}$ to the $W^{th}$ pixel), and encoding (2) is ended.

Figure 6:
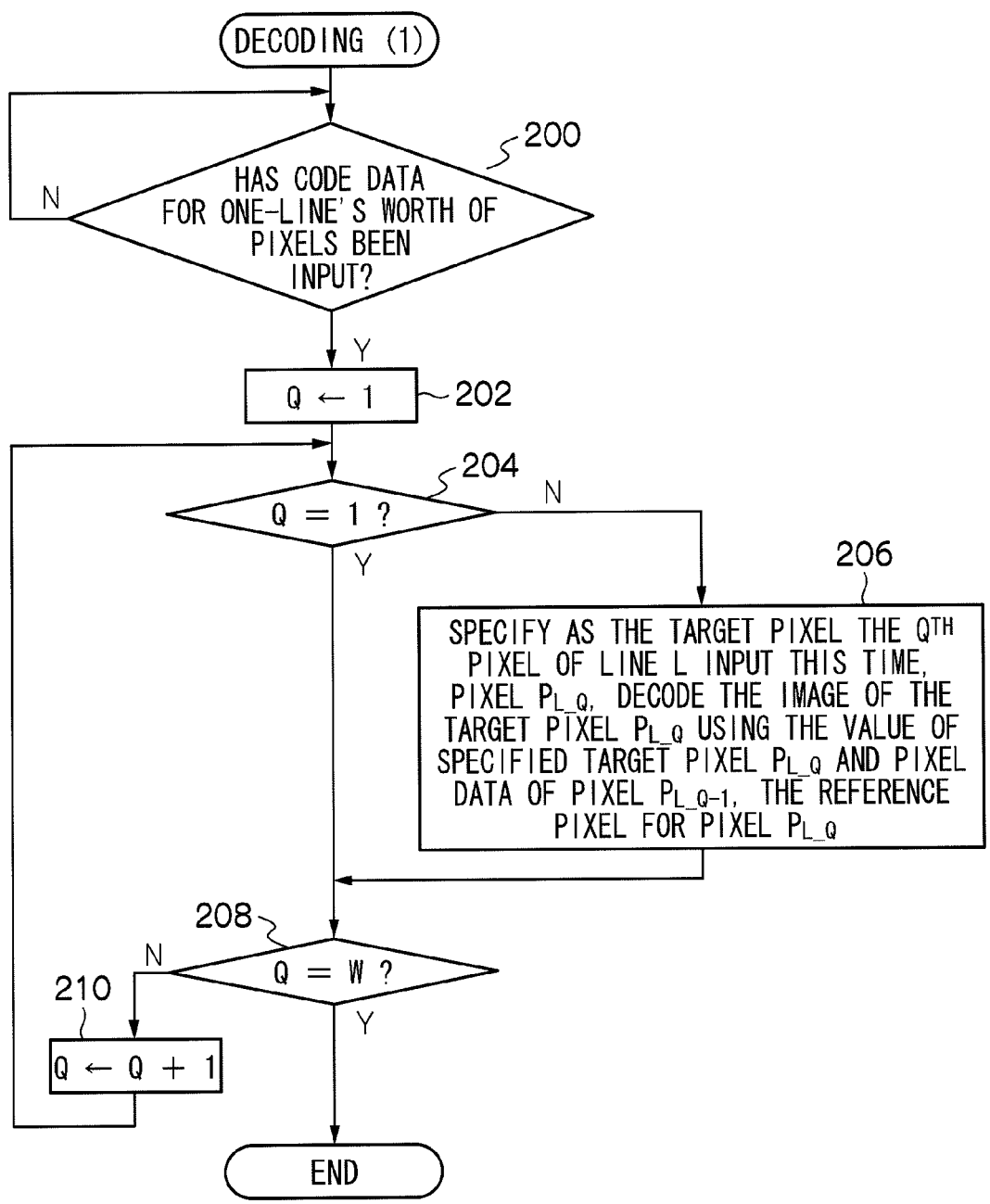
FIG. 6 is a diagram showing a flow chart of a processing routine of decoding (1) executed in a decoder of the first exemplary embodiment.

Explanation will next be given of the decoding (1) executed in the decoder 1, with reference to FIG. 6 and to FIGS. 5A and 5B.

First, at step 200, determination is made as to whether or not values (encoded values, namely encoded data) have been input from the CPU 20 for of one line of the pixels of the encoded image stored in the memory 24.

The determination processing is repeated at step 200 until determination is made that values (one line of encoded data (code data)) have been input from the CPU 20 for one line of the pixels of the encoded image stored in the memory 24.

When it is determined at step 200 that values of one line of the pixels of the encoded image stored in the memory 24 have been input from the CPU 20, the routine proceeds to the next step 202. At step 202 variable Q is initialized by setting the value of variable Q to 1.

At the next step 204 determination is made as to whether or not the value of variable Q is 1. When determination is made at step 204 that the value of variable Q is 1 then the routine proceeds to the next step 208. At step 208, determination is made as to whether or not the value of variable Q is the number of pixels W in one line of pixels. Determination is thereby made as to whether or not the processing for decoding of step 206, explained in detail below, has been performed for pixels up to the final pixel W of one line of pixels (from the $2^{nd}$ to the $W^{th}$ pixel).

When it is determined that the value of variable Q is not W at step 208, it is concluded that the decoding of step 206 has not been performed for pixels up to the final pixel of one line of pixels (from the $2^{nd}$ to the $W^{th}$ pixel), and the routine proceeds to step 210.

At step 210 the value of variable Q is incremented by 1. The routine then returns to step 204.

However, when it is determined at step 204 that the value of variable Q is not 1, the routine proceeds to the next step 206. At step 206 the $Q^{th}$ pixel of the pixels in the line L that was input this time, pixel $P_{L\_Q}$, is specified as the target pixel. The image of the target pixel $P_{L\_Q}$ is then decoded using the value of the specified target pixel $P_{L\_Q}$ and the pixel data of the reference pixel $P_{L\_Q-1}$ near the target pixel $P_{L\_Q}$. The routine then proceeds to step 208.

When, at step 208, the value of variable Q is determined to be W, then it is concluded that the decoding of step 206 has been performed for pixels up to the final pixel of one line of pixels (from the $2^{nd}$ to the $W^{th}$ pixel), and the decoding (1) is ended.

Figure 7:
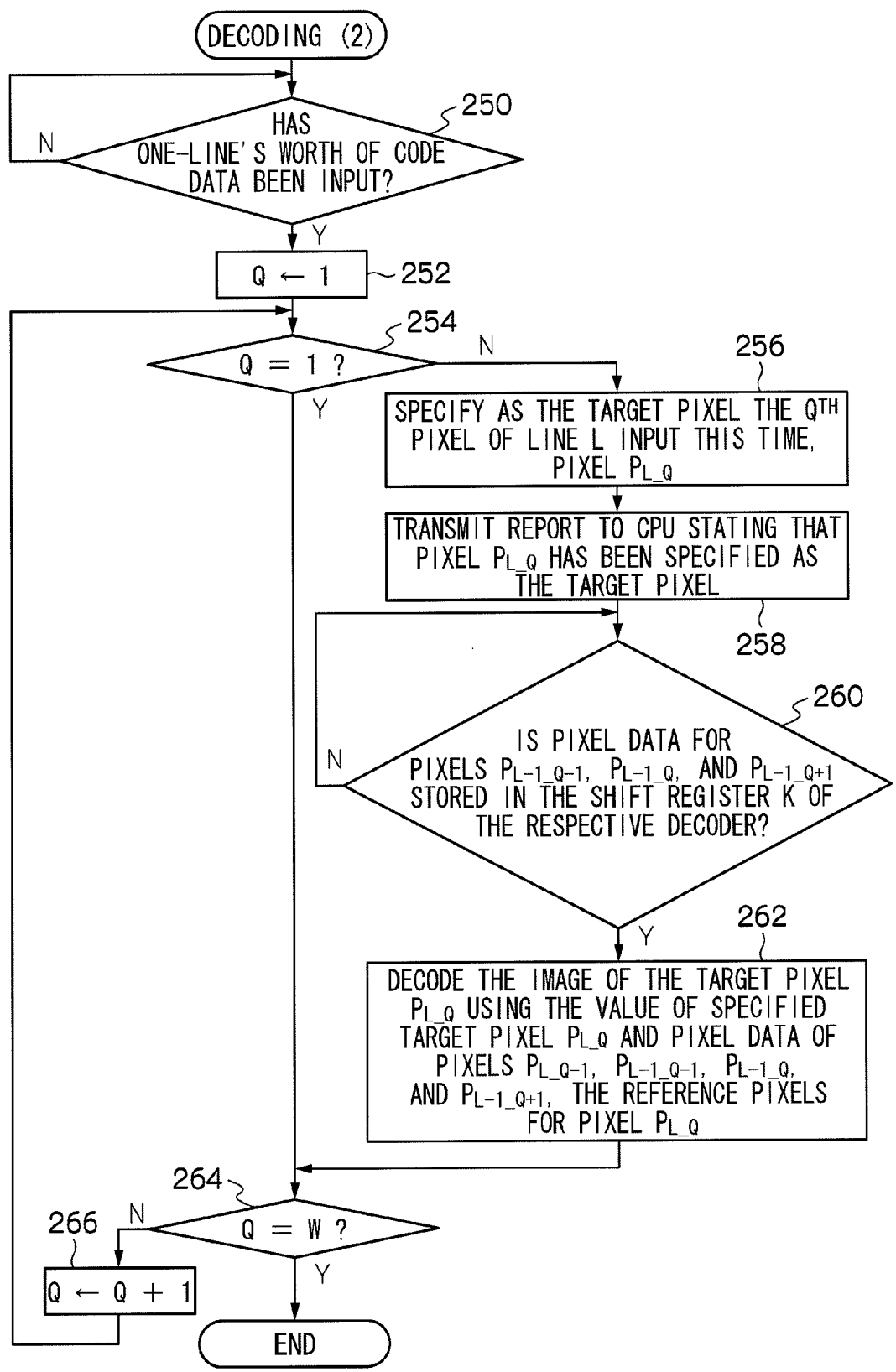
FIG. 7 is a diagram showing a flow chart of a processing routine of decoding (2) executed in a decoder of the first exemplary embodiment.

Explanation will now be given of the decoding (2) executed in each of the respective decoders 2 to N, with reference to FIG. 7 and FIGS. 5A and 5B.

First, at step 250, determination is made as to whether or not values (encoded values) have been input for one line of the pixels of the encoded image stored in the memory 24.

The determination processing is repeated at step 250 until determination is made that values have been input from the CPU 20 for one line of the pixels of the encoded image stored in the memory 24.

When it is determined at step 250 that values of one line of the pixels of the encoded image stored in the memory 24 have been input from the CPU 20, the routine proceeds to the next step 252. At step 252 variable Q is initialized by setting the value of variable Q to 1.

At the next step 254 determination is made as to whether or not the value of variable Q is 1. When determination is made at step 254 that the value of variable Q is 1 then the routine proceeds to the next step 264. At step 264 determination is made as to whether or not the value of variable Q is the number of pixels W in one line of pixels. Determination is thereby made as to whether or not the processing for decoding of steps 256 to 262, explained in detail below, has been performed for pixels up to the final pixel W of one line of pixels (from the $2^{nd}$ to the $W^{th}$ pixel).

At step 264, when the value of variable Q is determined as not being W, then it is concluded that the processing for encoding of steps 256 to 262 has not been performed for pixels up to the final pixel of one line of pixels (from the $2^{nd}$ to the $W^{th}$ pixel), and the routine then proceeds to step 266.

The value of variable Q is incremented by 1 at step 266. The routine then returns to step 254.

However, if it is determined at step 254 that the value of variable Q is not 1 then the routine proceeds to the next step 256. At step 256 the $Q^{th}$ pixel (the same value as the value of variable Q) of the pixels in line L that was input this time, this being pixel $P_{L\_Q}$, is specified as the target pixel.

In the next step 258, a result report representing the fact that the pixel $P_{L\_Q}$ has been specified as the target pixel is transmitted to the CPU 20.

In the next step 260, determination is made as to whether or not the pixel data of the pixels $P_{L-1\_Q-1}$, $P_{L-1\_Q}$, $P_{L-1\_Q+1}$ is stored in the shift register K (K=2, 3, ... N) of the respective decoder. The determination processing of step 260 is repeated until it is determined that the pixel data of the pixels $P_{L-1\_Q-1}$, $P_{L-1\_Q}$, $P_{L-1\_Q+1}$ is stored in the shift register K of the respective decoder.

When it is determined at step 260 that the pixel data of the pixels $P_{L-1\_Q-1}$, $P_{L-1\_Q}$, $P_{L-1\_Q+1}$ is stored in the shift register K of the respective decoder, the routine proceeds to the next step 262.

At step 262 the image of the target pixel $P_{L\_Q}$ is decoded using the value (encoded value) of the target pixel $P_{L\_Q}$ specified at above step 256, and using the reference pixels near the target pixel $P_{L\_Q}$, pixel data of the pixel $P_{L\_Q-1}$ and the pixel data of the pixels $P_{L-1\_Q-1}$, $P_{L-1\_Q}$, $P_{L-1\_Q+1}$ stored in the shift register K. The routine proceeds to step 264.

However, when determination is made at step 264 that the value of variable Q is W, it is concluded that the processing of steps 256 to 262 has been repeated for pixels (from the $2^{nd}$ to the $W^{th}$ pixel) up to the final pixel of one line of pixels, and the decoding (2) is ended.

Note that in the above example, explanation has been given of a case using the reference pixels near the target pixel $P_{L\_Q}$, pixel data of the pixel $P_{L\_Q-1}$ and the pixel data of the pixels $P_{L-1\_Q-1}$, $P_{L-1\_Q}$, $P_{L-1\_Q+1}$ stored in the shift register K, in the encoding (1), (2) and decoding (1), (2). However, configuration may be made such that at least one of the pixels $P_{L-1\_Q-1}$, $P_{L-1\_Q}$, $P_{L-1\_Q+1}$ is used as the reference pixel(s) near the target pixel $P_{L\_Q}$.

As explained above, the image processing device 12, serving as an encoding device of the present exemplary embodiment, includes the memory 24, shift registers 2 to N, CPU 20, and the encoders 2 to N. The memory 24 is the first memory that stores an image composed of plural pixels. Each of the shift registers 2 to N of the encoders 2 to N is a second memory, having storage capacity capable of storing at least the pixel data of the reference pixels $P_{L-1\_Q-1}$, $P_{L-1\_Q}$, $P_{L-1\_Q+1}$ near the target pixel $P_{L\_Q}$ of the image. The CPU 20 is a controller that stores the pixel data of the pixels corresponding to the reference pixels $P_{L-1\_Q-1}$, $P_{L-1\_Q}$, $P_{L-1\_Q+1}$ near the specified target pixel $P_{L\_Q}$ in the above respective shift registers 2 to N, each time the target pixels $P_{L\_Q}$ is specified in pixel encoding. The encoders are encoders that encode the image stored in the memory 24 by specifying in sequence each of the pixels stored in the memory 24 as the target pixel $P_{L\_Q}$ and estimating the image data of the target pixel $P_{L\_Q}$ using the image data of the reference pixels $P_{L-1\_Q-1}$, $P_{L-1\_Q}$, $P_{L-1\_Q+1}$ near the specified target pixel $P_{L\_Q}$ stored in the above shift registers 2 to N.

The image processing device 12, serving as a decoding device of the present exemplary embodiment, includes the memory 24, plural shift registers 2 to N, plural decoders 2 to N, and the CPU 20. The memory 24 is the first memory for storing an image composed of plural pixels. The plural shift registers 2 to N of the plural encoders 2 to N are plural second memories, having storage capacity capable of storing at least the pixel data of the reference pixels $P_{L-1\_Q-1}$, $P_{L-1\_Q}$, $P_{L-1\_Q+1}$ near the target pixel $P_{L\_Q}$ of the image. The plural decoders are provided in correspondence to each of the plural shift registers 2 to N, and are plural decoders that decode the image stored in the memory 24, by specifying in sequence each of the pixels stored in the memory 24 as the target pixel $P_{L\_Q}$ and using the encoded value of the specified target pixel $P_{L\_Q}$ and the image data stored in the corresponding respective shift register 2 to N. The CPU 20 is a controller that takes pixel data of those pixels in the image decoded by the specific decoder K that correspond to the reference pixels $P_{L-1\_Q-1}$, $P_{L-1\_Q}$, $P_{L-1\_Q+1}$ near the specified target pixel $P_{L\_Q}$ of another decoder K+1 different to the specific decoder K, and stores the pixel data in the shift register K+1 of the another decoder K+1, each time the target pixel $P_{L\_Q}$ is specified as the target pixel in the shift register K+1.

The image processing device 12 serving as a encoding device, is also provided with plural shift registers 2 to N and corresponding plural encoders to which the shift registers belong. The CPU 20, serving as a controller, specifies different target pixels for each of the plural encoders, and performs encoding. Encoding is thereby executed in parallel with the plural encoders.

In the image processing device 12 serving as a decoding device, the CPU 20, serving as a controller, specifies different target pixels for each of the plural decoders 1 to N, and performs decoding. Decoding is thereby executed in parallel with the plural decoders.

In addition, the target pixels processed by the plural encoders 1 to N are disposed such that they are each in different positions from each other in a subscanning direction, and a given target pixel does not overlap with another target pixel in a main scanning direction.

The target pixels processed by the plural decoders 1 to N are disposed such that they do not overlap with each other in the subscanning direction.

Second Exemplary Embodiment

Explanation will now be given of a second exemplary embodiment. Similar parts of the configuration to that of the first exemplary embodiment, and similar processing thereto, are allocated the same reference numerals and explanation thereof is omitted.

In the first exemplary embodiment, in the shift registers 2 to N of the encoders and the shift registers 2 to N of the decoders, the number of reference pixels for reference in the processing of each of the encoders and each of the decoders is, for example 4 (3+1), or 3. However, in the present exemplary embodiment the number of reference pixels for reference in the encoder 2 and the decoder 2 is set, for example, at 4, or 3, and the number of reference pixels for reference in the encoder 3 and the decoder 3 is, for example 7 (3×2+1), or 6. Namely the present exemplary embodiment differs in that the number of reference pixels for reference in the encoder K and in the decoder K (K=2, 3, ... N) is set up as ((K−1)×3+1) or ((K−1)×3). In the present exemplary embodiment, as long as the total of the storage capacities of the encoder shift registers 2 to N, and the total of the storage capacities of the decoder shift registers 2 to N, are less than "the storage capacity for image data of one line of pixels of the image", the present exemplary embodiment may also be configured with a memory, in each encoder and in each decoder, capable of storing at least the image data of the reference pixels used in the encoding of each respective encoder, or used in the decoding of each respective decoder.

When the CPU 20 of the present exemplary embodiment receives a report from the encoder K (K=2, 3, ... N) stating that the pixel $P_{i'j'}$ (i'=2, ... R; j'=2, ... W) has been specified as the target pixel, the CPU 20 reads out from the memory 24 data for (K−1) individual pixels, these being pixels $P_{i'-K+1\_j'+1}$, $P_{i'-K+2\_j'+1}$, ... $P_{i'-1\_j'+1}$, (from the reference pixels near the target pixel (pixel) $P_{i'\_j'}$ in the present exemplary embodiment, these being the ((K−1)×3) individual pixels of $P_{i'-K+1\_j'-1}$, $P_{i'-K+1\_j'}$, $P_{i'-K+1\_j'+1}$, ..., $P_{i'-1\_j'-1}$, $P_{i'-1\_j'}$, $P_{i'-1\_j'+1}$). The CPU 20 stores the pixel data of the read-out pixels $P_{i'-K+1\_j'+1}$, ... $P_{i'-1\_j'+1}$ in the shift register K. The shift register is used as the memory for storing the reference pixels in the present exemplary embodiment. Consequently, when the CPU 20 receives the report from the encoder K stating that the pixel $P_{i'\_j'}$ has been specified as the target pixel, the pixel data of the (K−1) individual pixels $P_{i'-K+1\_j'+1}$, ... $P_{i'-1\_j'+1}$ is read out from the memory 24, and the read-out pixel data of the pixels $P_{i'-K+1\_j'+1}$, ... $P_{i'-1\_j'+1}$ is used to refresh the shift register K. The contents stored in the shift register K thereby changes from the pixel data of the pixels $P_{i'-K+1\_j'-2}$, $P_{i'-K+1\_j'+1}$, $P_{i'-K+1\_j'}$ ... $P_{i'-1\_j'-2}$, $P_{i'-1\_j'-1}$, $P_{i'-1\_j'}$, to the pixel data of the pixels $P_{i'-K+1\_j'-1}$, $P_{i'-K+1\_j'}$, $P_{i'-K+1\_j'+1}$, ... $P_{i'-1\_j'-1}$, $P_{i'-1\_j'}$, $P_{i'-1\_j'+1}$. A memory other than the shift register may be used as the memory for storing the reference pixels used in processing. In such cases, when the CPU 20 receives a report from the encoder K stating that the pixel $P_{i'\_j'}$ has been specified as the target pixel, the CPU 20 may read out the pixel data of the reference pixels near the target pixel (pixel) $P_{i'\_j'}$ in the present exemplary embodiment, these being the pixels $P_{i'-K+1\_j'-1}$, $P_{i'-K+1\_j'}$, $P_{i'-K+1\_j'+1}$, ..., $P_{i'-1\_j'-1}$, $P_{i'-1\_j'}$, $P_{i'-1\_j'+1}$ from the memory, and store the read-out pixel data of the pixels $P_{i'-K+1\_j'-1}$, $P_{i'-K+1\_j'}$, $P_{i'-K+1\_j'+1}$, ..., $P_{i'-1\_j'-1}$, $P_{i'-1\_j'}$, $P_{i'-1\_j'+1}$ in this memory.

When the CPU 20 of the present exemplary embodiment receives a report from the decoder K+1 (K=1, 2, 3, ... N−1) stating that the pixel $P_{i'\_j'}$ (i'=2, ... R; j'=2, ... W) has been specified as the target pixel, the CPU 20 receives from the decoder K (via the memory 24) pixel data for (K−1) individual pixels, pixels $P_{i'-K+1\_j'+1}, P_{i'-K+2\_j'+1}, \ldots P_{i'-1\_j'+1}$, (from the reference pixels near the target pixel (pixel) $P_{i'\_j'}$ in the present exemplary embodiment, these being the ((K−1)× 3) individual pixels of $P_{i'-K+1\_j'-1}, P_{i'-K+1\_j'}, P_{i'-K+1\_j'+1}, \ldots, P_{i'-1\_j'-1}, P_{i'-1\_j'}, P_{i'-1\_j'+1}$). The CPU 20 uses the pixel data of the received pixels $P_{i'-K+1\_j'+1}, \ldots P_{i'-1\_j'+1}$ to refresh the shift register K+1 of the decoder K+1. Consequently, when the CPU 20 receives the report from the decoder K+1 stating that the pixel $P_{i'\_j'}$ has been specified as the target pixel, the pixel data for the pixels $P_{i'-K+1\_j'-1}, P_{i'-K+1\_j'}, \ldots P_{i'-1\_j'+1}$, pixel data which has been decoded by the decoder K, is received from the decoder K and the received pixel data for the pixels $P_{i'-K+1\_j'+1}, \ldots P_{i'-1\_j'+1}$ is used to refresh the shift register K+1. The contents stored in the shift register K+1 thereby changes from the pixel data of the pixels $P_{i'-K+1\_j'-2}, P_{i'-K+1\_j'-1}, P_{i'-K+1\_j'} \ldots P_{i'-1\_j'-2}, P_{i'-1\_j'-1}, P_{i'-1\_j'}$ to the pixel data of the pixels $P_{i'-K+1\_j'-1}, P_{i'-K+1\_j'}, P_{i'-K+1\_j'+1}, \ldots P_{i'-1\_j'-1}, P_{i'-1\_j'}, P_{i'-1\_j'+1}$. A memory other than the shift register may be used as the memory for storing the reference pixels used in processing. In such cases, when the CPU 20 receives a report from the decoder K+1 stating that the pixel $P_{i'\_j'}$ has been specified as the target pixel, the CPU 20 may receive the pixel data of the reference pixels near the target pixel (pixel) $P_{i'\_j'}$ in the present exemplary embodiment, these being the pixels $P_{i'-K+1\_j'-1}, P_{i'-K+1\_j'}, P_{i'-K+1\_j'+1}, \ldots, P_{i'-1\_j'-1}, P_{i'-1\_j'}, P_{i'-1\_j'+1}$ from the decoder K (via the memory 24), and store the received pixel data of the pixels $P_{i'-K+1\_j'-1}, P_{i'-K+1\_j'}, P_{i'-K+1\_j'+1}, \ldots, P_{i'-1\_j'-1}, P_{i'-1\_j'}, P_{i'-1\_j'+1}$ in this memory.

Figure 8:
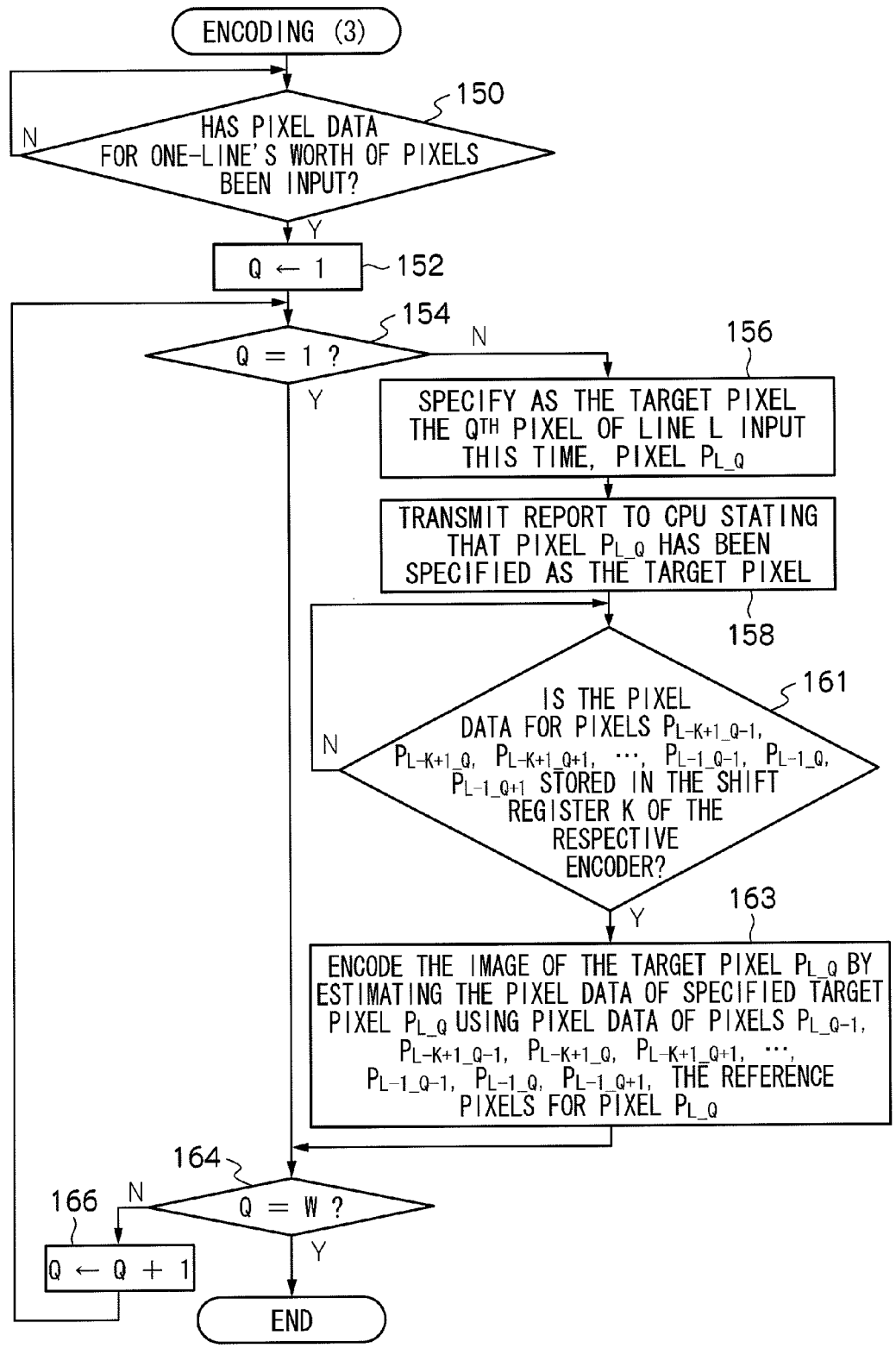
FIG. 8 is a diagram showing a flow chart of a processing routine of encoding (3) executed in an encoder of a second exemplary embodiment.
Figure 9A:
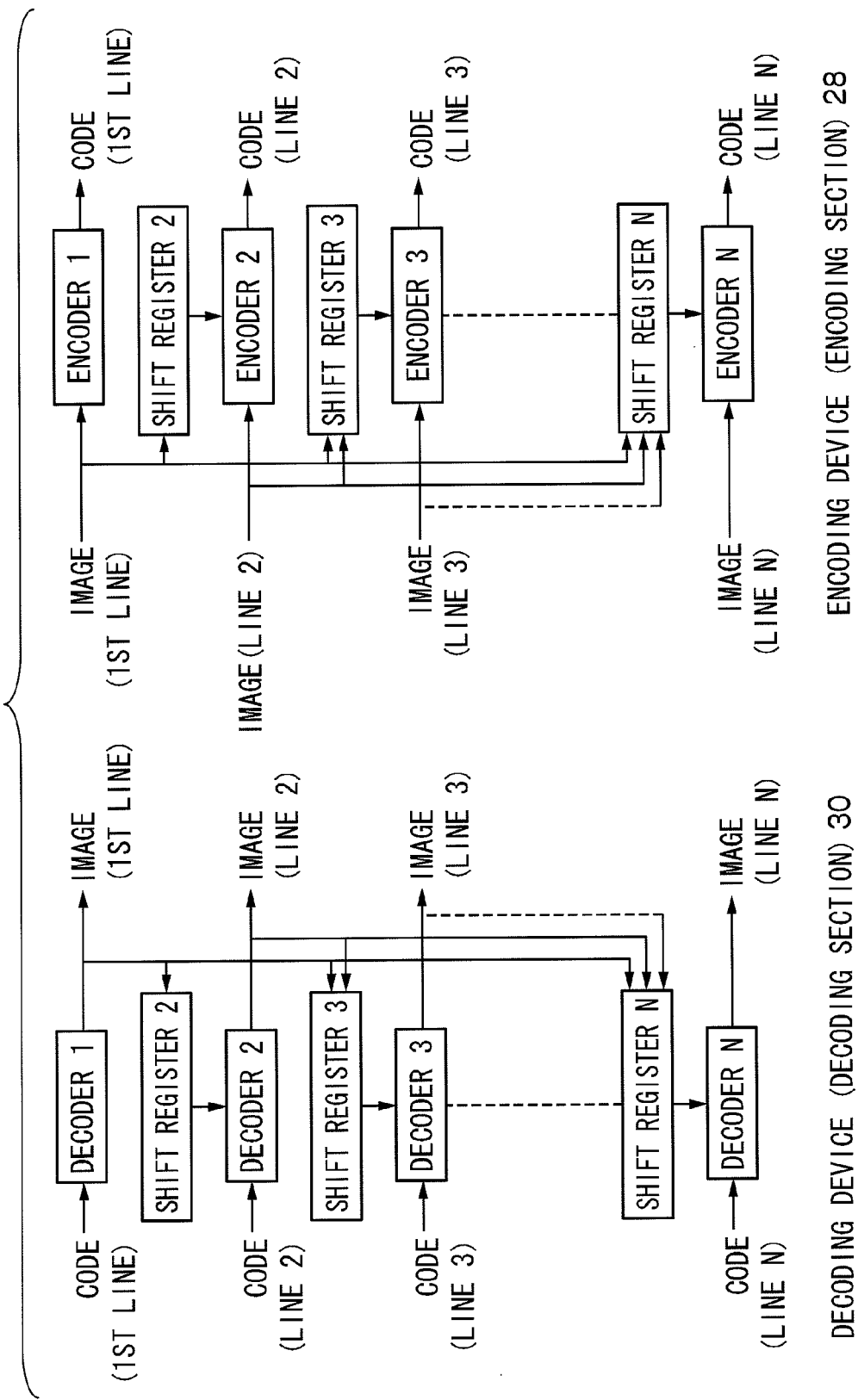

Explanation will now be given of encoding (3) executed in each of the encoders 2 to N in the present exemplary embodiment, with reference to FIG. 8 and FIGS. 9A, 9B. Explanation will be given of the example of FIGS. 9A, 9B, in which N=4. In place of step 160 of the first exemplary embodiment of the present invention, step 161 is executed, then after step 161, step 163 is executed, and next, after step 163, step 164 is executed.

At step 161, determination is made as to whether or not the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ is stored in the shift register K (K=2, 3, . . . N) of the respective encoder. The determination processing at step 161 is repeated until determination is made that the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ is stored in the shift register K of the respective encoder.

When determination is made at step 161 that the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ is stored in the shift register K of the respective encoder, the routine then proceeds to step 163.

At step 163, the image of the target pixel $P_{L\_Q}$ is then encoded by estimating the pixel data of the target pixel $P_{L\_Q}$ specified in the above step 156, using the reference pixels near the target pixel $P_{L\_Q}$, namely, the pixel data for the pixel $P_{L\_Q-1}$ and the pixel data for the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ stored in the shift register K. The routine then proceeds to step 164. Note that at step 163, the image of the target pixel $P_{L\_Q}$ may be encoded by estimating the pixel data of the target pixel $P_{L\_Q}$ specified in the above step 156, using the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ stored in the shift register K as the reference pixels. The routine then proceeds to step 164.

Figure 10:
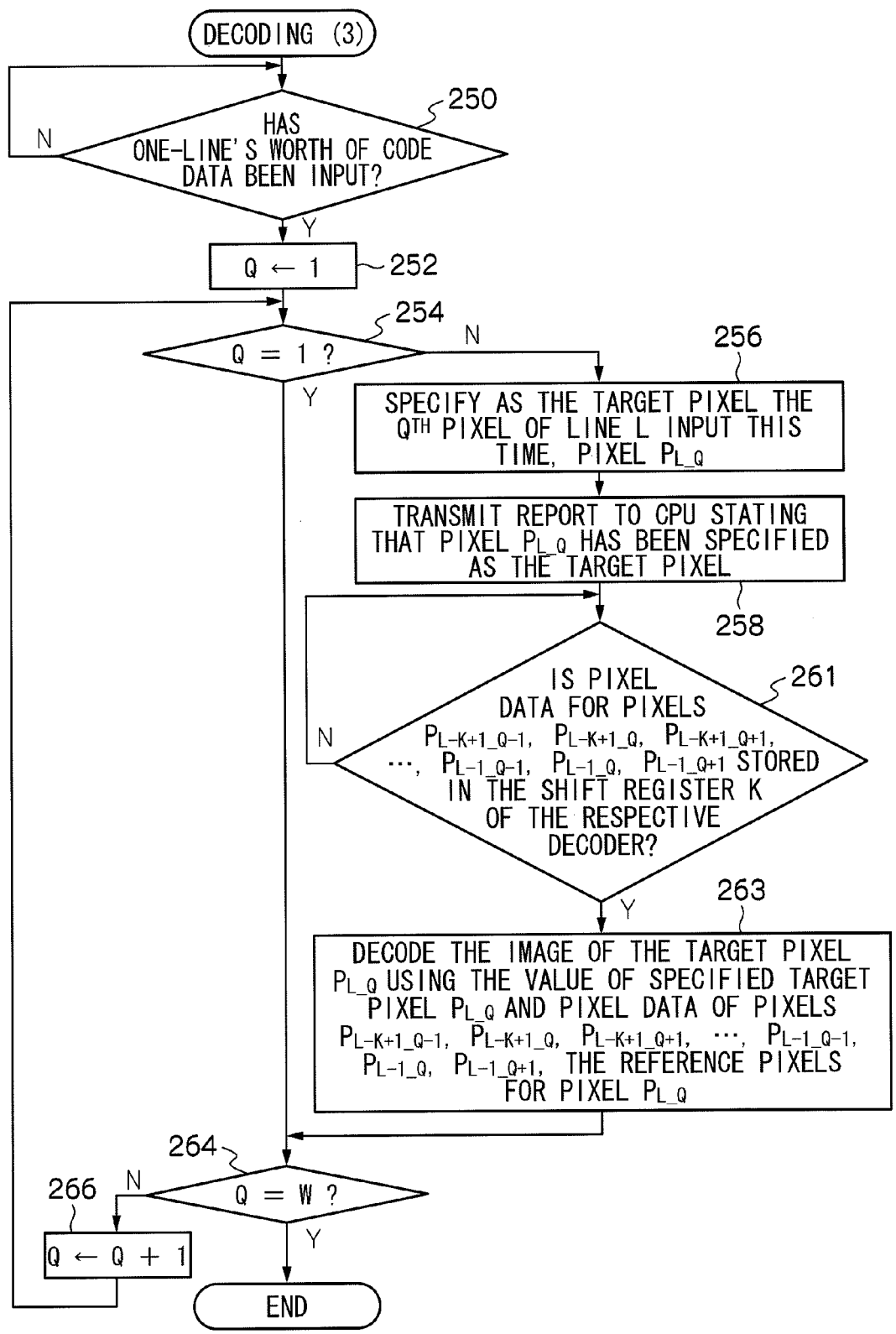
FIG. 10 is a diagram showing a flow chart of a processing routine of decoding (3) executed in a decoder of the second exemplary embodiment.

Explanation will now be given of decoding (3) executed in each of the decoders 2 to N in the present exemplary embodiment, with reference to FIG. 10 and FIGS. 9A, 9B. In place of step 260 of the first exemplary embodiment of the present invention, step 261 is executed, then after step 261, step 263 is executed, and next, after step 263, step 264 is executed.

At step 261, determination is made as to whether or not the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ is stored in the shift register K (K=2, 3, . . . N) of the respective decoder. The determination processing at step 261 is repeated until determination is made that the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ is stored in the shift register K of the respective decoder.

When it is determined at step 261 that the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ is stored in the shift register K of the respective decoder the routine then proceeds to step 263.

At step 263, the image of the target pixel $P_{L\_Q}$ is then decoded using the value (encoded value) of the target pixel $P_{L\_Q}$ specified in step 256 above, and using the reference pixels near the target pixel $P_{L\_Q}$, the pixel data for $P_{L\_Q-1}$ and the pixel data for the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ stored in the shift register K. Note that at step 263, the image of the target pixel $P_{L\_Q}$ may be encoded by predicting the pixel data of the target pixel $P_{L\_Q}$ specified in the above step 256, using the pixel data of the pixels $P_{L-K+1\_Q-1}, P_{L-K+1\_Q}, P_{L-K+1\_Q+1}, \ldots, P_{L-1\_Q-1}, P_{L-1\_Q}, P_{L-1\_Q+1}$ stored in the shift register K as the reference pixels. The routine then proceeds to step 264.

Third Exemplary Embodiment

Figure 11:
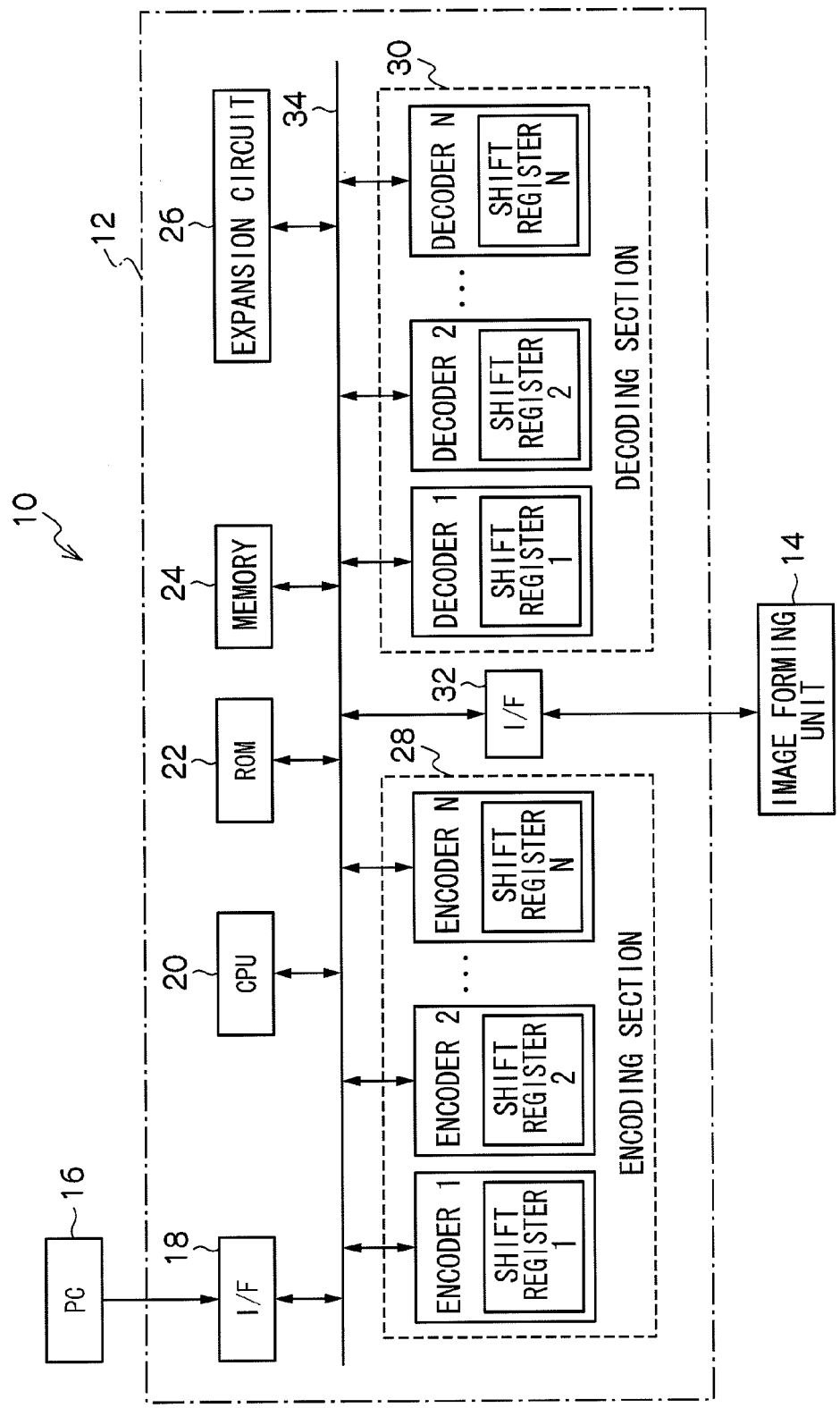
FIG. 11 is a schematic diagram showing a third exemplary embodiment.

Explanation will now be given of a third exemplary embodiment. In the third exemplary embodiment, as shown in FIG. 11, an encoder 1 is provided with a shift register 1, and a decoder 1 is provided with a shift register 1. These shift registers 1 have a storage capacity sufficient for image data of the reference pixels used for encoding of the respective encoder, or for decoding of the respective decoder. This "storage capacity sufficient for image data of the reference pixels" is less than "the storage capacity sufficient for one line of pixels of an image". For example, if the number of reference pixels used in encoding in the encoder is 3, and the image data of one pixel is 8 bits, then the storage capacity of the shift register for this encoder is 24 (3×8) bits worth of storage capacity. As long as the shift register 1 of the encoder and the shift register 1 of the decoder is smaller than "the storage capacity sufficient for one line of pixels of an image", in the same way as in the first exemplary embodiment and the second exemplary embodiment, then a suitable storage capacity is any that can store at least the image data of the reference pixels used for the encoding of the encoder, or for the decoding of the decoder.

In the present exemplary embodiment, encoder 1 executes the encoding (1) for encoding the 1$^{st}$ line of the image, encoding the image of the 1$^{st}$ line. However, subsequent lines to the 1$^{st}$ line of the N+1$^{th}$ line, the 2N+1$^{th}$ line, . . . (NX+1: X=1, 2, . . . ), execute the encoding (2) or the encoding (3). The pixel data of the reference pixels used in the encoding (2) or the encoding (3) is, as shown in FIG. 12, pixel data of the image the encoder N encoded in the previous scan line to the current scan line, stored as a line buffer in the memory 24.

Figure 12:
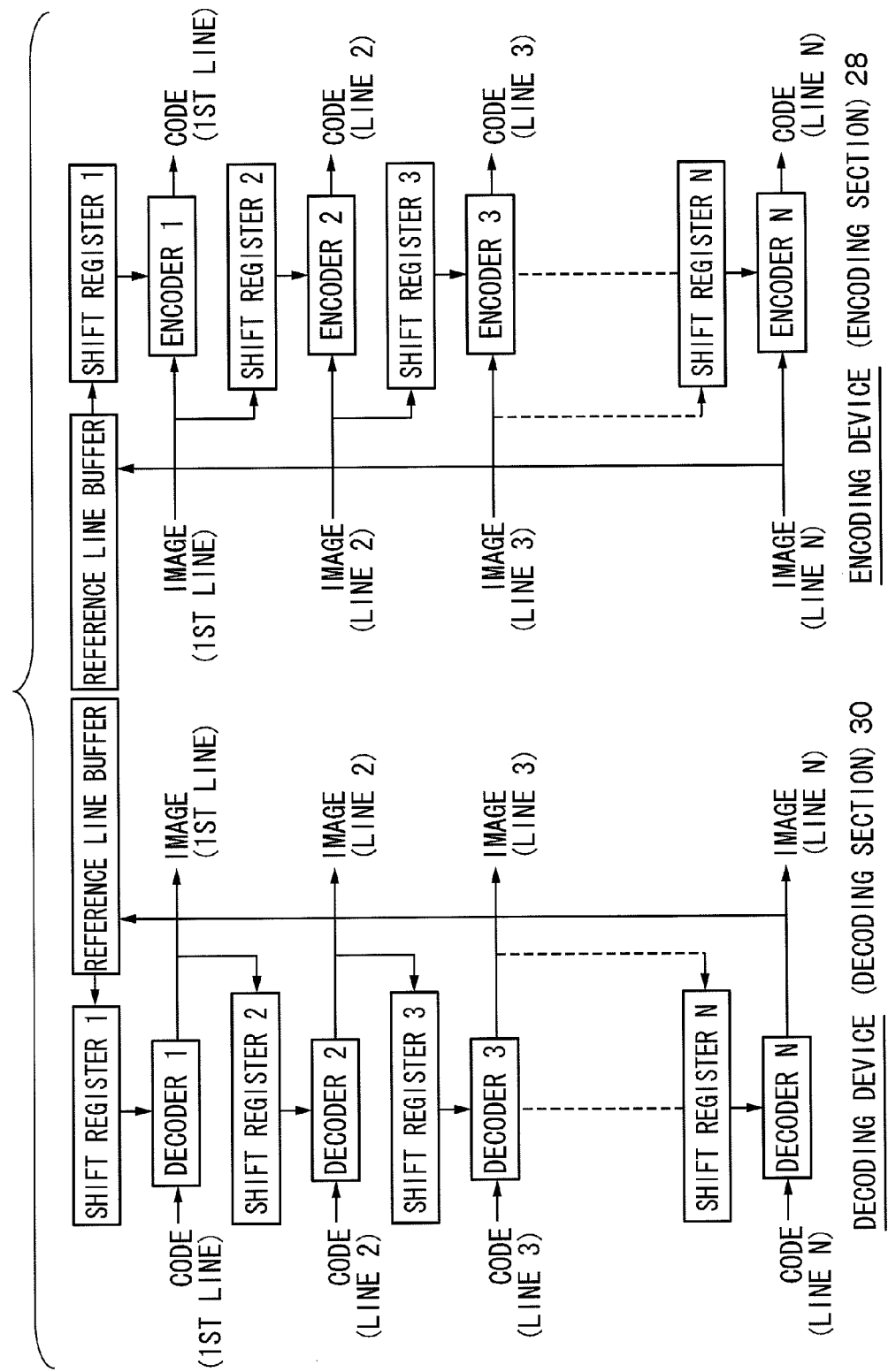
FIG. 12 is a diagram for explaining encoding and decoding in the third exemplary embodiment.

In the present exemplary embodiment, as shown in FIG. 12, when the encoder 1 executes the encoding (2) or the encoding (3), the CPU 20 stores, for each of the specified target pixels in the encoding (2) or the encoding (3) of the encoder 1, pixel data (image data) of pixels corresponding to the reference pixels near the specified target pixels, in the shift register 1 of the encoder 1. More specifically, when the CPU 20 receives a report from the encoder 1 stating that the pixel $P_{i'\_j'}$ (i'=2 ... R; j'=2, ... W) is specified as the target pixel, the CPU 20 reads in from the memory 24 the pixel data of the pixel $P_{i'-1\_j'+1}$, out of the reference pixels near the target pixel (pixel) $P_{i'\_j'}$, these being pixels $P_{i'-1\_j'-1}$, $P_{i'-1\_j'}$, $P_{i'-1\_j'+1}$. The CPU 20 then stores the read-in pixel data of the pixel $P_{i'-1\_j'+1}$ in the shift register 1. Note that the shift register is used as the memory for storing the reference pixels used in the present exemplary embodiment. Consequently, when the CPU 20 receives a report from the encoder 1 stating that the pixel $P_{i'\_j'}$ has been specified as the target pixel, the pixel data for the pixel $P_{i'-1\_j'+1}$ is read out from the memory 24, and the pixel data of the pixel $P_{i'-1\_j'+1}$ is used to refresh the shift register 1. The contents stored in the shift register 1 thereby changes from the pixel data of the pixels $P_{i'-1\_j'-2}$, $P_{i'-1\_j'-1}$, $P_{i'-1\_j'}$ to the pixel data of the pixels $P_{i'-1\_j'-1}$, $P_{i'-1\_j'}$, $P_{i'-1\_j'+1}$. If a memory other than the shift register is used as the memory for storing the reference pixels used in processing, then when a report is received from the encoder 1 stating that the pixel $P_{i'\_j'}$ has been specified as the target pixel, the pixel data of the reference pixels near the target pixel (pixel) $P_{i'\_j'}$ of the present exemplary embodiment, that is the pixels $P_{i'-1\_j'-1}$, $P_{i'-1\_j'}$, $P_{i'-1\_j'+1}$, is read out from the memory 24, and the pixel data of pixels $P_{i'-1\_j'-1}$, $P_{i'-1\_j'}$, $P_{i'-1\_j'+1}$ is stored in this memory.

In the present exemplary embodiment, decoder 1 executes the decoding (1) for decoding the 1$^{st}$ line of the image, decoding the image of the 1$^{st}$ line. However, the subsequent lines to the 1$^{st}$ line of the N+1$^{th}$ line, the 2N+1$^{th}$ line, ... (NX+1: X=1, 2, ... ), execute the decoding (2) or the decoding (3). The pixel data of the reference pixels used in the decoding (2) or the decoding (3) is, as shown in FIG. 12, pixel data of the image of the line the decoder N decoded in the previous scan line to the current scan line, stored as a line buffer in the memory 24.

In the present exemplary embodiment, as shown in FIG. 12, when the decoder 1 executes the decoding (2) or the decoding (3), for each of the target pixels specified by the decoder different to the given decoder N (decoder 1 in the present exemplary embodiment), the CPU 20 stores in the shift register 1 of the decoder 1 pixel data of the pixels of the image decoded by a given decoder N during the previous scan, that correspond to the reference pixels near the specified target pixels of another decoder (the decoder 1 in the present exemplary embodiment) encoder. More specifically, when the CPU 20 receives a report stating that the pixel $P_{i'\_j'}$ (i'=2 ... R; j'=2, ... W) is specified as the target pixel, the CPU 20 reads in, through the memory 24 serving as a line buffer, the pixel data of the pixel $P_{i'-1\_j'+1}$, decoded by the decoder N during the previous scan, from the reference pixels near the target pixel (pixel) $P_{i'\_j'}$ in the present exemplary embodiment, these being pixels $P_{i'-1\_j'-1}$, $P_{i'-1\_j'}$, $P_{i'-1\_j'+1}$. The CPU 20 then uses the read-in pixel data of the pixel $P_{i'-1\_j'+1}$ to refresh the shift register 1. The contents stored in the shift register 1 thereby changes from the pixel data of the pixels $P_{i'-1\_j'-2}$, $P_{i'-1\_j'-1}$, $P_{i'-1\_j'}$ to the pixel data of the pixels $P_{i'-1\_j'-1}$, $P_{i'-1\_j'}$, $P_{i'-1\_j'+1}$. If a memory is used other than the shift register as the memory for storing the reference pixels, when a report is received from the decoder 1 stating that the pixel $P_{i'\_j'}$ has been specified as the target pixel, the pixel data of the reference pixels near the target pixel (pixel) $P_{i'\_j'}$ of the present exemplary embodiment, that is the pixels $P_{i'-1\_j'-1}$, $P_{i'-1\_j'}$, $P_{i'-1\_j'+1}$, is read out from the memory 24, and the pixel data of pixels $P_{i'-1\_j'-1}$, $P_{i'-1\_j'}$, $P_{i'-1\_j'+1}$ is stored in this memory.

Fourth Exemplary Embodiment

Figure 13:
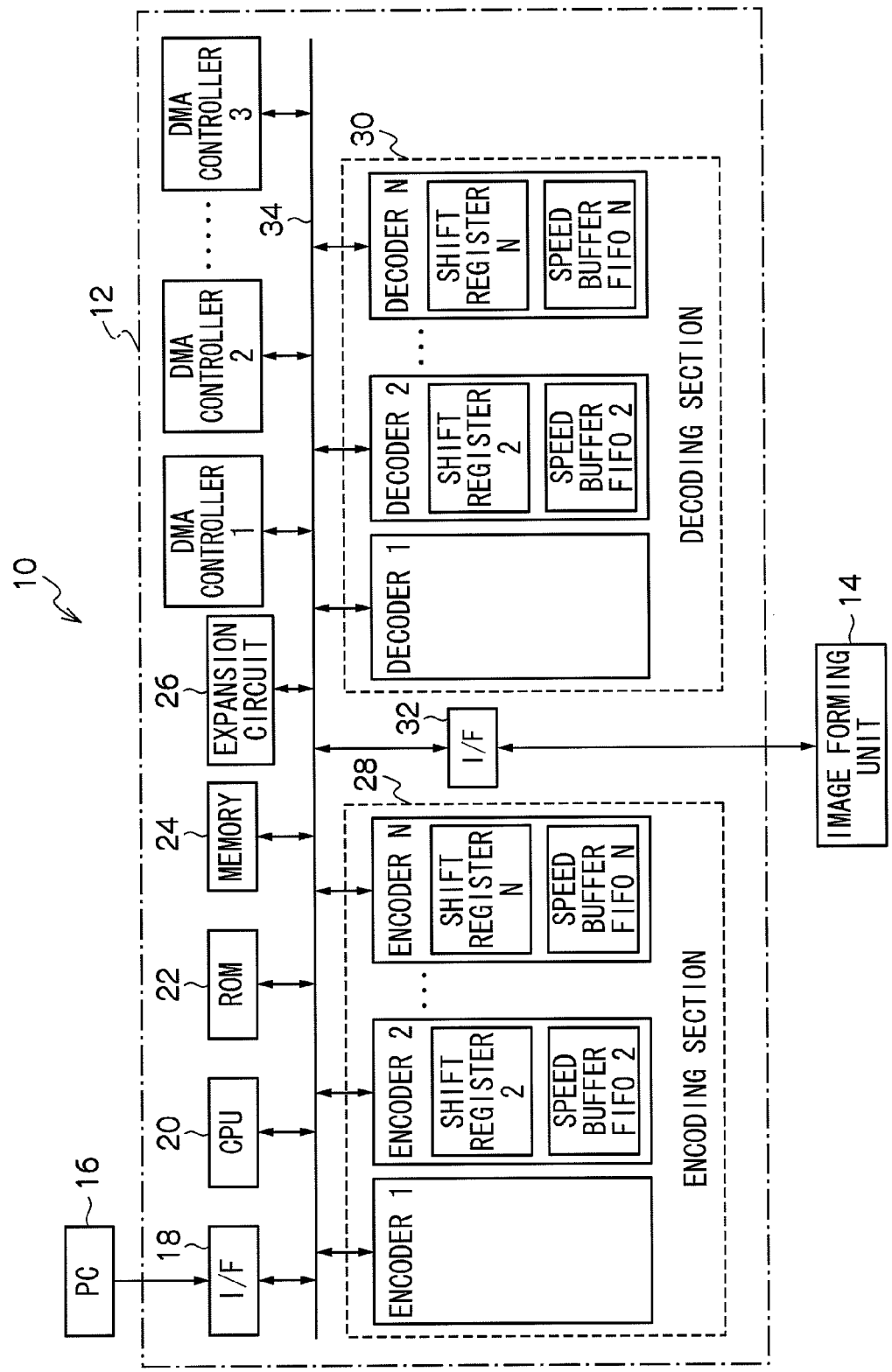
FIG. 13 is a schematic diagram showing a fourth exemplary embodiment.

Explanation will now be given of a fourth exemplary embodiment. An image processing device 12 of an image forming device 10 of the present exemplary embodiment is, as shown in FIG. 13, provided with N individual DMA (Direct Memory Access) controllers 1 to N, associated with each of the respective encoders 1 to N, and each of the respective decoders 1 to N. Each of the DMA controllers is connected to a bus 34. In the present exemplary embodiment, instead of the CPU 20 communicating with the encoders 1 to N, the transmission of various data between the CPU 20 and each of the encoders 1 to N proceeds by the CPU 20 sending instructions to each of the respective DMA controllers 1 to N, and the respective DMA controllers 1 to N communicating with the respective encoders 1 to N. In a similar manner, instead of the CPU 20 communicating with the decoders 1 to N, the transmission of various data between the CPU 20 and each of the decoders 1 to N proceeds by the CPU 20 sending instructions to each of the respective DMA controllers 1 to N and the corresponding DMA controller communicating with the respective decoders 1 to N.

As shown in FIG. 13, each of the encoders K (K=2, 3, ... N) of the image processing device 12 of the present exemplary embodiment, is provided with a FIFO buffer K for speed buffering (K=2, 3, ... N). Configuration is thereby made such that arriving pixel data sent from the corresponding DMA controller K is stored in the shift register K of the encoder K, through the buffer K. The plural buffers 2 to N of the encoders 2 to N are provided so as to adjust the number of pixels encoded by each of the encoders with the number of pixels encoded by the encoder of the encoders 2 to N that encodes the smallest number of pixels within a given duration T, the smallest number being out of the respective numbers of pixels encoded by each of the respective plural encoders 2 to N. Each of the decoders K (K=2, 3, ... N) is also provided with a FIFO buffer K (K=2, 3, ... N) for speed buffering (for speed adjusting), and configured such that arriving pixel data sent from the corresponding DMA controller K is stored in the shift register K of the decoder K, through the buffer K. The plural buffers 2 to N of the decoders 2 to N are provided so as to adjust the number of pixels decoded by each of the other decoders with the number of pixels decoded by the decoder of the decoders 2 to N that decodes the smallest number of pixels within a given duration T, the smallest number being out of the respective numbers of pixels decoded by each of the respective plural decoders 2 to N.

For example, determination is made as to whether or not the pixel data of the reference pixels required for the encoding, or the decoding, is stored in the shift register, at step 160 and step 260 in the first exemplary embodiment, and at step 161 and step 261 in the second exemplary embodiment. However, in the present exemplary embodiment, for example, when this determination is negative (namely that the pixel data of the reference pixels required for processing is not stored in the shift register) then additional determination is made as to whether or not the FIFO buffer used for speed adjusting in the respective encoder 2 to N, or respective decoders 2 to N, has reached the capacity thereof. Only when determination is made that the FIFO buffer has not reached the capacity thereof does the routine then proceed from step 160 to step 162, from step 260 to step 262, from step 161 to step 163, or from step 261 to step 263.

Figure 14:
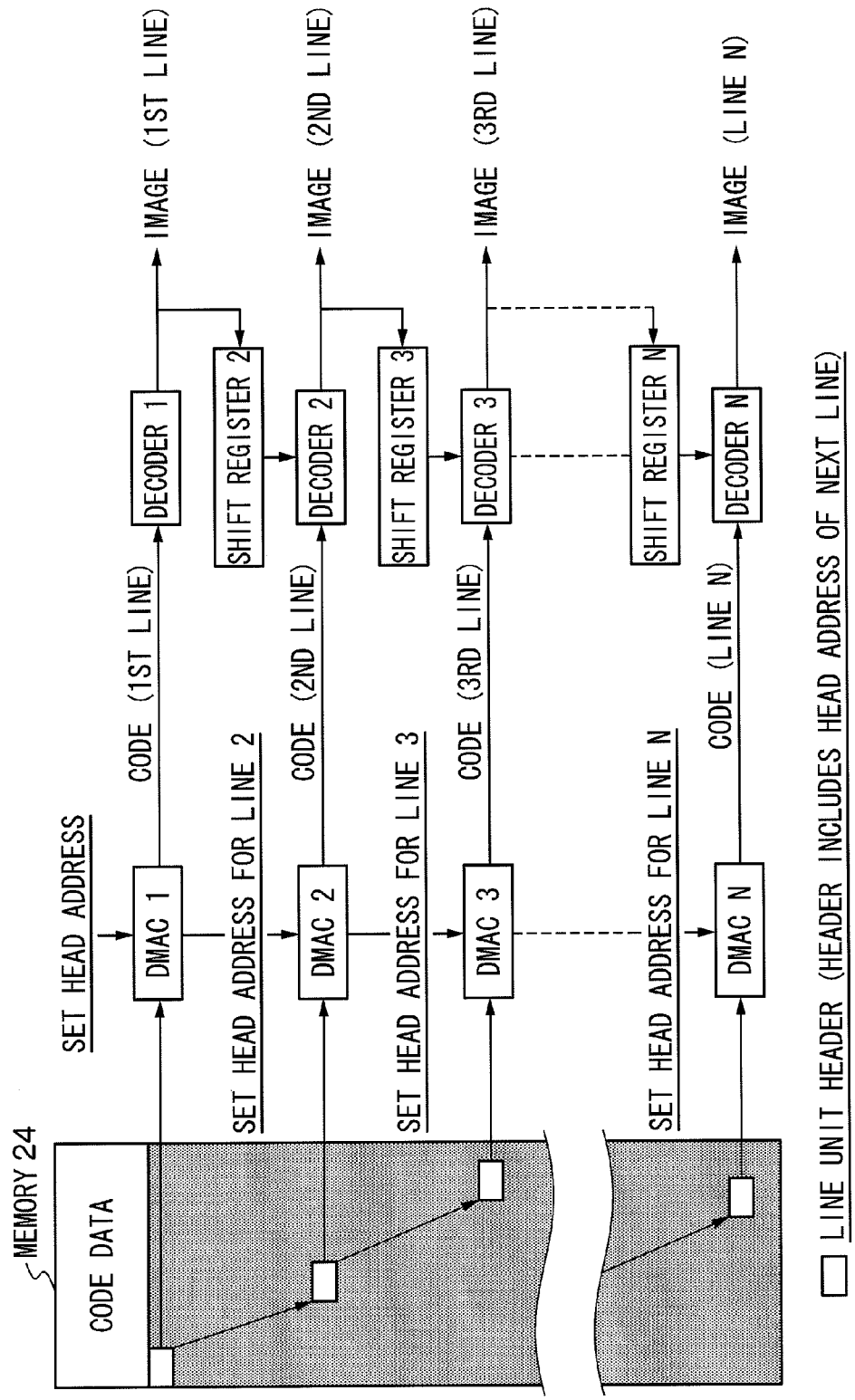
FIG. 14 is schematic diagram showing an example of a modification to the fourth exemplary embodiment.

Note that, as shown in FIG. 14, if the encoded data (code data) is disposed in the memory 24, then in decoding (decompression processing) it is necessary to read-out each line of encoded data in parallel substantially simultaneously. Therefore configuration may be made in which a header is added to the encoded data by line unit, so that the encoded data of each line is read out in parallel substantially simultaneously by the respective DMA controllers 2 to N, provided (connected) so as to correspond to each of the respective decoders 2 to N, reading out the headers of successive line units. If the processing speed of transmission processing of the DMA controllers is the same as, or greater than, a reference value a indicated to be a high speed, then a single DMA controller may be corresponded with all of the parallelized decompressing devices. The placing of the line unit headers is not required to be at the head of the encoded data of each line unit, and the headers may be amalgamated into one and placed on the memory 24.

In each of the above exemplary embodiments explanation has been given of modes in which a control processing program is stored (installed) in advance on the ROM 22. However, the present invention is not limited thereto. For example, application of the present invention may be made to modes such as a mode in which the control processing program is stored in advance on another memory (such as, for example, a HDD (Hard Disk Drive)), a mode in which the control processing program provided is stored on a computer readable storage medium, such as a CD-ROM, DVD-ROM etc., a mode in which the control processing program is distributed via a wired or wireless communication unit, and other such modes.

What is claimed is:

1. An encoding device comprising:
   a first memory that stores image data;
   a plurality of second memories that are associated with a plurality of target pixels in the image data, each second memory storing pixel data of one or more reference pixels near the associated target pixel thereof;
   a controller that causes each second memory to store pixel data of the one or more reference pixels near the associated target pixel thereof specified from the image data stored in the first memory; and
   a plurality of encoders that perform encoding on each of the plurality of target pixels by estimating pixel data of each target pixel using pixel data of the one or more reference pixels near each respective target pixel stored in the plurality of second memories;
   wherein the plurality of target pixels have different positions in a subscanning direction such that one target pixel does not overlap with another target pixel in a main scanning direction, and storage capacity sufficient for pixel data of all of the reference pixels used by the plurality of encoders is equal to or less than storage capacity sufficient for one line of image data stored in the first memory.

2. The encoding device of claim 1, further comprising a plurality of speed adjusting units provided in correspondence with respective encoders of the plurality of encoders that adjust the number of pixels encoded by each of the encoders to the number of pixels encoded by the encoder that encodes the smallest number of pixels, from respective numbers of pixels encoded by each of the respective plurality of encoders within a given duration.

3. An image forming device comprising at least the encoding device of claim 2.

4. The image forming device according to claim 3, further comprising a decoding device comprising:
   a first memory that stores encoded image data;
   a plurality of second memories associated with a plurality of target pixels in the image data, each second memory storing pixel data of one or more reference pixels near the associated target pixel thereof;
   a controller that causes each second memory to store pixel data of the one or more reference pixels near the associated target pixel thereof specified from the image data stored in the first memory; and
   a plurality of decoders that perform decoding on each of the plurality of target pixels by estimating pixel data of each target pixel using pixel data of the one or more reference pixels near each respective target pixel stored in the plurality of second memories,
   wherein the plurality of target pixels have different positions in a subscanning direction such that one target pixel does not overlap with another target pixel in a main scanning direction, and storage capacity sufficient for pixel data of all of the reference pixels used by the plurality of decoders is equal to or less than storage capacity sufficient for one line of image data stored in the first memory.

5. The image forming device of claim 4, wherein the decoding device further comprises a plurality of speed adjusting units provided in correspondence with respective decoders of the plurality of decoders that adjust the number of pixels decoded by each of the decoders to the number of pixels decoded by the decoder that decodes the smallest number of pixels, from respective numbers of pixels decoded by each of the respective plurality of decoders within a given duration.

6. An image forming device comprising at least the encoding device of claim 1.

7. The image forming device according to claim 6, further comprising a decoding device comprising:
   a first memory that stores encoded image data;
   a plurality of second memories associated with a plurality of target pixels in the image data, each second memory storing pixel data of one or more reference pixels near the associated target pixel thereof;
   a controller that causes each second memory to store pixel data of the one or more reference pixels near the associated target pixel thereof specified from the image data stored in the first memory; and
   a plurality of decoders that perform decoding on each of the plurality of target pixels by estimating pixel data of each target pixel using pixel data of the one or more reference pixels near each respective target pixel stored in the plurality of second memories,
   wherein the plurality of target pixels have different positions in a subscanning direction such that one target pixel does not overlap with another target pixel in a main scanning direction, and storage capacity sufficient for pixel data of all of the reference pixels used by the plurality of decoders is equal to or less than storage capacity sufficient for one line of image data stored in the first memory.

8. The image forming device of claim 7, wherein the decoding device further comprises a plurality of speed adjusting units provided in correspondence with respective decoders of the plurality of decoders that adjust the number of pixels decoded by each of the decoders to the number of pixels decoded by the decoder that decodes the smallest number of pixels, from respective numbers of pixels decoded by each of the respective plurality of decoders within a given duration.

9. A decoding device comprising:
   a first memory that stores encoded image data;
   a plurality of second memories associated with a plurality of target pixels in the image data, each second memory storing pixel data of one or more reference pixels near the associated target pixel thereof;
   a controller that causes each second memory to store pixel data of the one or more reference pixels near the associated target pixel thereof specified from the image data stored in the first memory; and a plurality of decoders that perform decoding on each of the plurality of target pixels by estimating pixel data of each target pixel using pixel data of the one or more reference pixels near each respective target pixel stored in the plurality of second memories, wherein the plurality of target pixels have different positions in a subscanning direction such that one target pixel does not overlap with another target pixel in a main scanning direction, and storage capacity sufficient for pixel data of all of the reference pixels used by the plurality of decoders is equal to or less than storage capacity sufficient for one line of image data stored in the first memory.

10. The decoding device of claim 9, further comprising a plurality of speed adjusting units provided in correspondence with respective decoders of the plurality of decoders that adjust the number of pixels decoded by each of the decoders to the number of pixels decoded by the decoder that decodes the smallest number of pixels, from respective numbers of pixels decoded by each of the respective plurality of decoders within a given duration.

11. An image forming device comprising at least the decoding device of claim 10.

12. An image forming device comprising at least the decoding device of claim 9.

13. The image forming device of claim 12, further comprising a plurality of speed adjusting units provided in correspondence with respective decoders of the plurality of decoders that adjust the number of pixels decoded by each of the decoders to the number of pixels decoded by the decoder that decodes the smallest number of pixels, from respective numbers of pixels decoded by each of the respective plurality of decoders within a given duration.

14. A computer readable storage medium storing a computer program that causes a computer to execute an encoding process, the process comprising:
storing image data;
storing pixel data of one or more reference pixels near each of a plurality of target pixels in the image data; and
encoding the respective target pixels by estimating pixel data of the target pixels in the image data, using pixel data of the one or more reference pixels near each respective target pixel,
wherein the plurality of target pixels have different positions in a subscanning direction such that one target pixel does not overlap with another target pixel in a main scanning direction, and storage capacity sufficient for pixel data of all of the reference pixels is equal to or less than storage capacity sufficient for one line of image data.

15. A computer readable storage medium storing a computer program that causes a computer to execute a decoding process, the process comprising:
storing pixel data of one or more reference pixels near each of a plurality of target pixels in image data from encoded image data;
storing image data of the one or more reference pixels near each respective target pixels; and
decoding the respective target pixels by estimating pixel data of the target pixels in the image data using pixel data of the one or more reference pixels near each respective target pixel,
wherein the plurality of target pixels have different positions in a subscanning direction such that one target pixel does not overlap with another target pixel in a main scanning direction, and storage capacity sufficient for pixel data of each of the reference pixels is equal to or less than storage capacity sufficient for one line of image data.

16. An encoding method comprising:
storing image data;
storing pixel data of one or more reference pixels near each of a plurality of target pixels in the image data; and
encoding the respective target pixels by estimating pixel data of the target pixels in the image data, using pixel data of the one or more reference pixels near each respective target pixel,
wherein the plurality of target pixels have different positions in a subscanning direction such that one target pixel does not overlap with another target pixel in a main scanning direction, and storage capacity sufficient for pixel data of all of the reference pixels is equal to or less than storage capacity sufficient for one line of image data.

17. A decoding method comprising:
storing pixel data of one or more reference pixels near each of a plurality of target pixels in encoded image data;
storing the pixel data of the one or more reference pixels near each respective target pixel; and
decoding the respective target pixels by estimating pixel data of the target pixels in the image data using pixel data of the one or more reference pixels near each respective target pixel,
wherein the plurality of target pixels have different positions in a subscanning direction such that one target pixel does not overlap with another target pixel in a main scanning direction, and storage capacity sufficient for pixel data of each of the reference pixels is equal to or less than storage capacity sufficient for one line of image data.

* * * * *